United States Patent
Ohkawa

(10) Patent No.: US 11,301,192 B2
(45) Date of Patent: Apr. 12, 2022

(54) PRINTING MANAGEMENT SYSTEM, PRINTING MANAGEMENT APPARATUS, AND NON-TRANSITORY COMPUTER READABLE MEDIUM

(71) Applicant: FUJIFILM Business Innovation Corp., Tokyo (JP)

(72) Inventor: Kazuhiro Ohkawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 320 days.

(21) Appl. No.: 16/352,862

(22) Filed: Mar. 14, 2019

(65) Prior Publication Data
US 2019/0377529 A1 Dec. 12, 2019

(30) Foreign Application Priority Data
Jun. 12, 2018 (JP) .............................. JP2018-111723

(51) Int. Cl.
*G06F 3/12* (2006.01)

(52) U.S. Cl.
CPC .......... *G06F 3/1263* (2013.01); *G06F 3/1208* (2013.01); *G06F 3/1285* (2013.01)

(58) Field of Classification Search
CPC .... G06F 3/1263; G06F 3/1285; G06F 3/1208; G06F 3/1286; G06F 3/1287; B41F 33/00
USPC .......................................................... 358/1.15
See application file for complete search history.

(56) References Cited

U.S. PATENT DOCUMENTS

| | | | |
|---|---|---|---|
| 9,489,162 B2 * | 11/2016 | Piazza ................... | G06F 3/1294 |
| 2006/0039707 A1 * | 2/2006 | Mima ................ | G03G 15/5083 399/23 |
| 2016/0188268 A1 * | 6/2016 | Yamagishi ........... | H04N 1/6036 358/1.15 |

FOREIGN PATENT DOCUMENTS

JP 2007-087042 4/2007

* cited by examiner

*Primary Examiner* — Neil R McLean
(74) *Attorney, Agent, or Firm* — JCIPRNET

(57) ABSTRACT

A printing management system includes a first acquisition unit, a second acquisition unit, and a determination unit. The first acquisition unit acquires one or more pieces of image quality information. Each of the one or more pieces of image quality information is information on an image quality required for a printing result obtained by processing a piece of print information. The second acquisition unit acquires a printing characteristic of a printer. The determination unit determines a printing order of multiple pieces of print information in the printer, by using multiple pieces of image quality information, each of which is acquired for one of the multiple pieces of print information by the first acquisition unit, and by using the printing characteristic acquired by the second acquisition unit.

14 Claims, 19 Drawing Sheets

FIG. 5

```
ADD SCHEDULE OF IMAGE QUALITY ADJUSTMENT                    [ − □ × ]

SUBJECT
      REGULAR IMAGE QUALITY ADJUSTMENT
  TARGET PERIOD
      START DATE   2018/3/11        END DATE   2019/3/11

11─  ☑ REGISTER AS REGULAR SCHEDULE ITEM
      TARGET DAY
          ☐SUN  ☑MON  ☐TUE  ☑WED  ☐THU  ☑FRI  ☐SAT
  TARGET TIME
      START   08:00       (0:00 - 23:59)
  REQUIRED TIME PERIOD   [15] MIN
  HIGH-IMAGE-QUALITY-GUARANTEED TIME PERIOD  [5] H  [30] MIN AFTER COMPLETION
  SETTING OPERATOR
      Administrator
  COMMENT
  ┌──────────────────────────────────────┐
  │                                      │
  │                                      │
  └──────────────────────────────────────┘

[ CANCEL ]  [ OK ]
                                                     │
                                                    12
```

FIG. 7A

| PRINT JOB | IMAGE QUALITY LEVEL | PRINTING TIME | DEADLINE |
|---|---|---|---|
| JOB A | HIGH | 2 | MAR 12 |
| JOB B | LOW | 1 | MAR 12 |
| JOB C | HIGH | 1 | MAR 12 |
| JOB D | LOW | 4 | MAR 12 |
| JOB E | LOW | 5 | MAR 13 |
| JOB F | LOW | 2 | MAR 14 |
| JOB G | HIGH | 2.5 | MAR 14 |
| JOB H | HIGH | 1.5 | MAR 14 |
| JOB I | HIGH | 1 | MAR 15 |
| JOB J | LOW | 3 | MAR 15 |
| JOB K | LOW | 2.5 | MAR 15 |
| JOB L | LOW | 1.5 | MAR 16 |
| JOB M | HIGH | 3 | MAR 16 |
| JOB N | LOW | 4 | MAR 16 |
| JOB O | LOW | 2 | MAR 19 |

FIG. 7B

HIGH-IMAGE-QUALITY GROUP

| PRINT JOB | PRINTING TIME | DEADLINE |
|---|---|---|
| JOB A | 2 | MAR 12 |
| JOB C | 1 | MAR 12 |
| JOB G | 2.5 | MAR 14 |
| JOB H | 1.5 | MAR 14 |
| JOB I | 1 | MAR 15 |
| JOB M | 3 | MAR 16 |

LOW-IMAGE-QUALITY GROUP

| PRINT JOB | PRINTING TIME | DEADLINE |
|---|---|---|
| JOB B | 1 | MAR 12 |
| JOB D | 4 | MAR 12 |
| JOB E | 5 | MAR 13 |
| JOB F | 2 | MAR 14 |
| JOB J | 3 | MAR 15 |
| JOB K | 2.5 | MAR 15 |
| JOB L | 1.5 | MAR 16 |
| JOB N | 4 | MAR 16 |
| JOB O | 2 | MAR 19 |

| PRINT JOB | IMAGE QUALITY LEVEL | PRINTING TIME | DEADLINE | RESULT |
|---|---|---|---|---|
| JOB A | HIGH | 2 | MAR 12 | OK |
| JOB B | LOW | 1 | MAR 12 | |
| JOB C | HIGH | 1 | MAR 12 | OK |
| JOB D | LOW | 4 | MAR 12 | |
| JOB E | LOW | 5 | MAR 13 | |
| JOB F | LOW | 2 | MAR 14 | OK |
| JOB G | HIGH | 2.5 | MAR 14 | NG |
| JOB H | HIGH | 1.5 | MAR 14 | OK |
| JOB I | HIGH | 1 | MAR 15 | |
| JOB J | LOW | 3 | MAR 15 | |
| JOB K | LOW | 2.5 | MAR 15 | |
| JOB L | LOW | 1.5 | MAR 16 | OK |
| JOB M | HIGH | 3 | MAR 16 | |
| JOB N | LOW | 4 | MAR 16 | |
| JOB O | LOW | 2 | MAR 19 | |

| PRINT JOB | IMAGE QUALITY LEVEL | PRINTING TIME | DEADLINE | RESULT |
|---|---|---|---|---|
| JOB A | HIGH | 2 | MAR 12 | OK |
| JOB B | LOW | 1 | MAR 12 | OK |
| JOB C | HIGH | 1 | MAR 12 | OK |
| JOB D | LOW | 4 | MAR 12 | OK |
| JOB E | LOW | 5 | MAR 13 | OK |
| JOB F | LOW | 2 | MAR 14 | OK |
| JOB G | HIGH | 2.5 | MAR 14 | OK |
| JOB H | HIGH | 1.5 | MAR 14 | NG |
| JOB I | HIGH | 1 | MAR 15 | OK |
| JOB J | LOW | 3 | MAR 15 | OK |
| JOB K | LOW | 2.5 | MAR 15 | OK |
| JOB L | LOW | 1.5 | MAR 16 | OK |
| JOB M | HIGH | 3 | MAR 16 | OK |
| JOB N | LOW | 4 | MAR 16 | OK |
| JOB O | LOW | 2 | MAR 19 | OK |

FIG. 10

| UNASSIGNED JOB | IMAGE QUALITY LEVEL | PRINTING TIME | DEADLINE |
|---|---|---|---|
| JOB H | HIGH | 1.5 | MAR 14 |
| JOB X | HIGH | 6 | MAR 20 |
| JOB Y | LOW | 10 | MAR 31 |

| PRINT JOB | IMAGE QUALITY LEVEL | PRINTING TIME | DEADLINE | RESULT |
|---|---|---|---|---|
| JOB A | HIGH | 2 | MAR 12 | OK |
| JOB B | LOW | 1 | MAR 12 | |
| JOB C | HIGH | 1 | MAR 12 | OK |
| JOB D | LOW | 4 | MAR 12 | |
| JOB E | LOW | 5 | MAR 13 | |
| JOB F | LOW | 2 | MAR 14 | |
| JOB G | HIGH | 2.5 | MAR 14 | OK |
| JOB H | HIGH | 1.5 | MAR 14 | OK |
| JOB I | HIGH | 1 | MAR 15 | |
| JOB J | LOW | 3 | MAR 15 | |
| JOB K | LOW | 2.5 | MAR 15 | |
| JOB L | LOW | 1.5 | MAR 16 | |
| JOB M | HIGH | 3 | MAR 16 | |
| JOB N | LOW | 4 | MAR 16 | |
| JOB O | LOW | 2 | MAR 19 | |

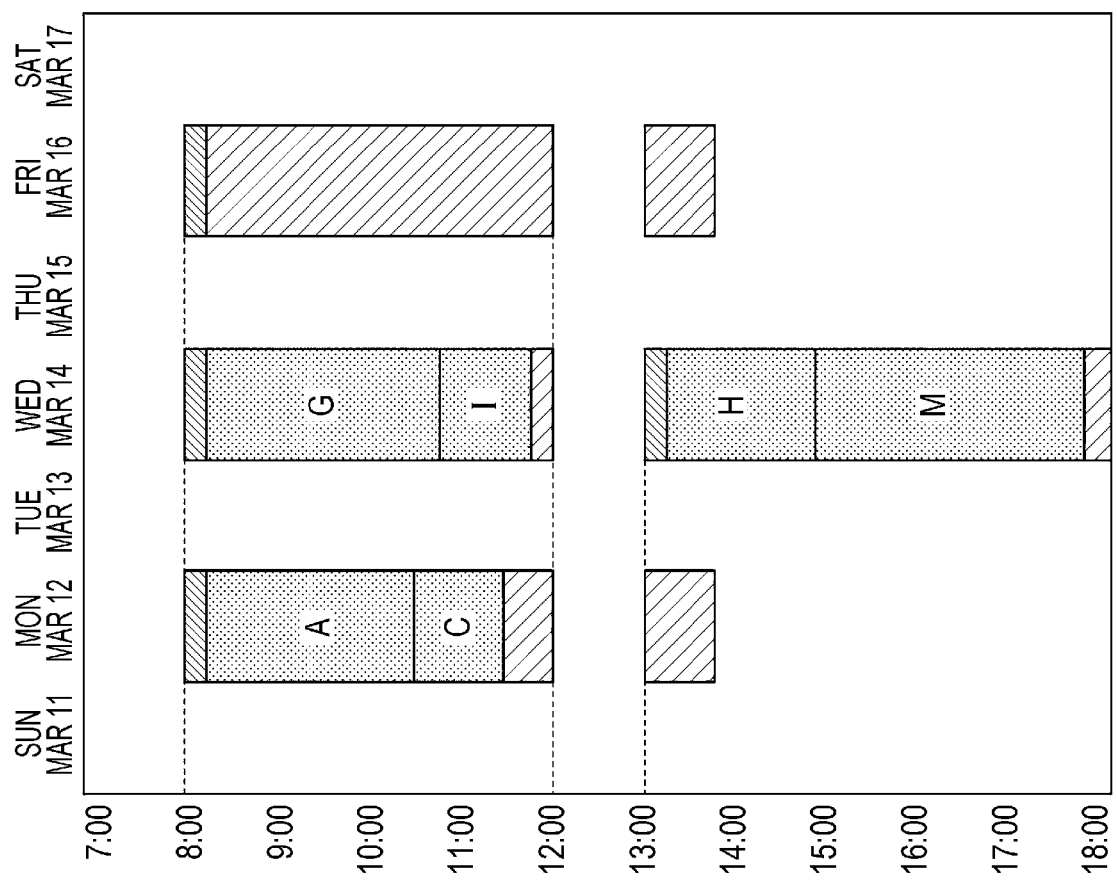

| PRINT JOB | IMAGE QUALITY LEVEL | PRINTING TIME | DEADLINE | RESULT |
|---|---|---|---|---|
| JOB A | HIGH | 2 | MAR 12 | OK |
| JOB B | LOW | 1 | MAR 12 | OK |
| JOB C | HIGH | 1 | MAR 12 | OK |
| JOB D | LOW | 4 | MAR 12 | OK |
| JOB E | LOW | 5 | MAR 13 | OK |
| JOB F | LOW | 2 | MAR 14 | OK |
| JOB G | HIGH | 2.5 | MAR 14 | OK |
| JOB H | HIGH | 1.5 | MAR 14 | OK |
| JOB I | HIGH | 1 | MAR 15 | OK |
| JOB J | LOW | 3 | MAR 15 | OK |
| JOB K | LOW | 2.5 | MAR 15 | OK |
| JOB L | LOW | 1.5 | MAR 16 | OK |
| JOB M | HIGH | 3 | MAR 16 | OK |
| JOB N | LOW | 4 | MAR 16 | OK |
| JOB O | LOW | 2 | MAR 19 | OK |

| PRINT JOB | IMAGE QUALITY LEVEL | PRINTING TIME | DEADLINE | RESULT |
|---|---|---|---|---|
| JOB A | HIGH | 2 | MAR 12 | OK |
| JOB B | LOW | 1 | MAR 12 | OK |
| JOB C | HIGH | 1 | MAR 12 | OK |
| JOB D | LOW | 4 | MAR 12 | OK |
| JOB E | LOW | 5 | MAR 13 | OK |
| JOB F | LOW | 2 | MAR 14 | |
| JOB G | HIGH | 2.5 | MAR 14 | |
| JOB H | HIGH | 1.5 | MAR 14 | |
| JOB I | HIGH | 1 | MAR 15 | |
| JOB J | LOW | 3 | MAR 15 | |
| JOB K | LOW | 2.5 | MAR 15 | |
| JOB L | LOW | 1.5 | MAR 16 | |
| JOB M | HIGH | 3 | MAR 16 | |
| JOB N | LOW | 4 | MAR 16 | |
| JOB O | LOW | 2 | MAR 19 | |

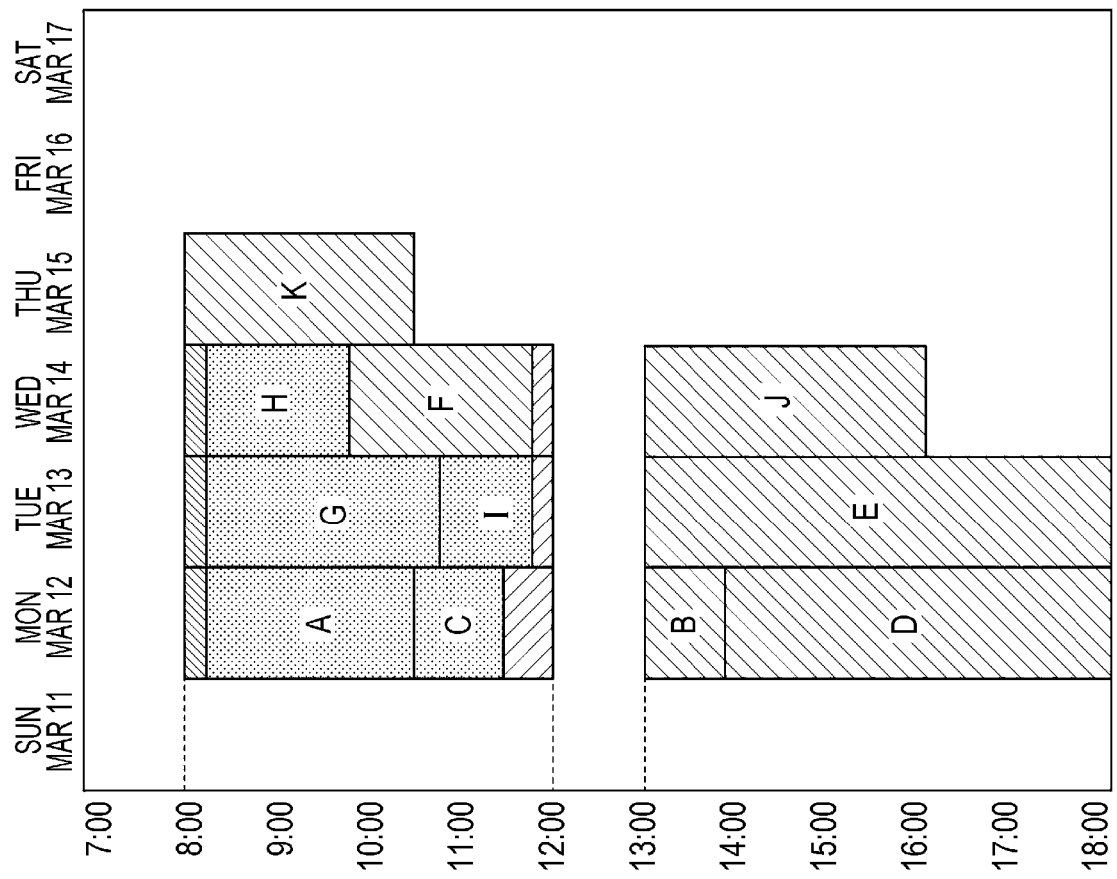

| PRINT JOB | IMAGE QUALITY LEVEL | PRINTING TIME | DEADLINE | RESULT |
|---|---|---|---|---|
| JOB A | HIGH | 2 | MAR 12 | OK |
| JOB B | LOW | 1 | MAR 12 | OK |
| JOB C | HIGH | 1 | MAR 12 | OK |
| JOB D | LOW | 4 | MAR 12 | OK |
| JOB E | LOW | 5 | MAR 13 | OK |
| JOB F | LOW | 2 | MAR 14 | OK |
| JOB G | HIGH | 2.5 | MAR 14 | OK |
| JOB H | HIGH | 1.5 | MAR 14 | OK |
| JOB I | HIGH | 1 | MAR 15 | OK |
| JOB J | LOW | 3 | MAR 15 | OK |
| JOB K | LOW | 2.5 | MAR 15 | OK |
| JOB L | LOW | 1.5 | MAR 16 | OK |
| JOB M | HIGH | 3 | MAR 16 | OK |
| JOB N | LOW | 4 | MAR 16 | OK |
| JOB O | LOW | 2 | MAR 19 | OK |

PRINTING MANAGEMENT SYSTEM, PRINTING MANAGEMENT APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-111723 filed Jun. 12, 2018.

BACKGROUND

(i) Technical Field

The present disclosure relates to a printing management system, a printing management apparatus, and a non-transitory computer readable medium.

(ii) Related Art

For example, Japanese Unexamined Patent Application Publication No. 2007-87042 discloses a print job management system for managing print jobs. The print job management system includes print schedule management means for managing print jobs and a print schedule for a printing device, print job status check means capable of checking print statuses of the print jobs, print job priority management means for setting the order of precedence for the print jobs to assign priorities to the print jobs, and interrupt printing means capable of, when printing a certain print job, printing another print job at the same time by using multiple-up printing.

SUMMARY

In some cases, the order in which a plurality of pieces of print information are to be printed may be determined. If the printing order is determined without consideration of image qualities required for printing results, for example, a printer may print the pieces of print information with deteriorated printing characteristics and consequently provide printing results that do not meet the required image qualities.

Aspects of non-limiting embodiments of the present disclosure relate to a technique for increasing the feasibility of printing pieces of print information in order that meets image qualities required for printing results obtained by processing the pieces of print information, compared to a configuration in which the printing order of the pieces of print information is determined without consideration of the required image qualities.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a printing management system including a first acquisition unit, a second acquisition unit, and a determination unit. The first acquisition unit acquires one or more pieces of image quality information. Each of the one or more pieces of image quality information is information on an image quality required for a printing result obtained by processing a piece of print information. The second acquisition unit acquires a printing characteristic of a printer. The determination unit determines a printing order of a plurality of pieces of print information in the printer, by using a plurality of pieces of image quality information, each of which is acquired for one of the plurality of pieces of print information by the first acquisition unit, and by using the printing characteristic acquired by the second acquisition unit.

BRIEF DESCRIPTION OF THE DRAWINGS

An exemplary embodiment of the present disclosure will be described in detail based on the following figures, wherein:

FIG. 5 illustrates an exemplary screen for receiving addition of a schedule of image quality adjustment;

FIGS. 7A and 7B illustrate an example of print jobs to be printed by a printer;

FIG. 10 illustrates an exemplary list screen of unassigned jobs;

FIGS. 12A to 12F illustrate an exemplary process for adding a schedule of image quality adjustment; and FIGS. 13A to 13F illustrate an exemplary process in a case where image quality adjustment is not scheduled in advance.

DETAILED DESCRIPTION

The following describes an exemplary embodiment of the present disclosure in detail with reference to the accompanying drawings.

Overall Configuration of Printing System

Figure 1:
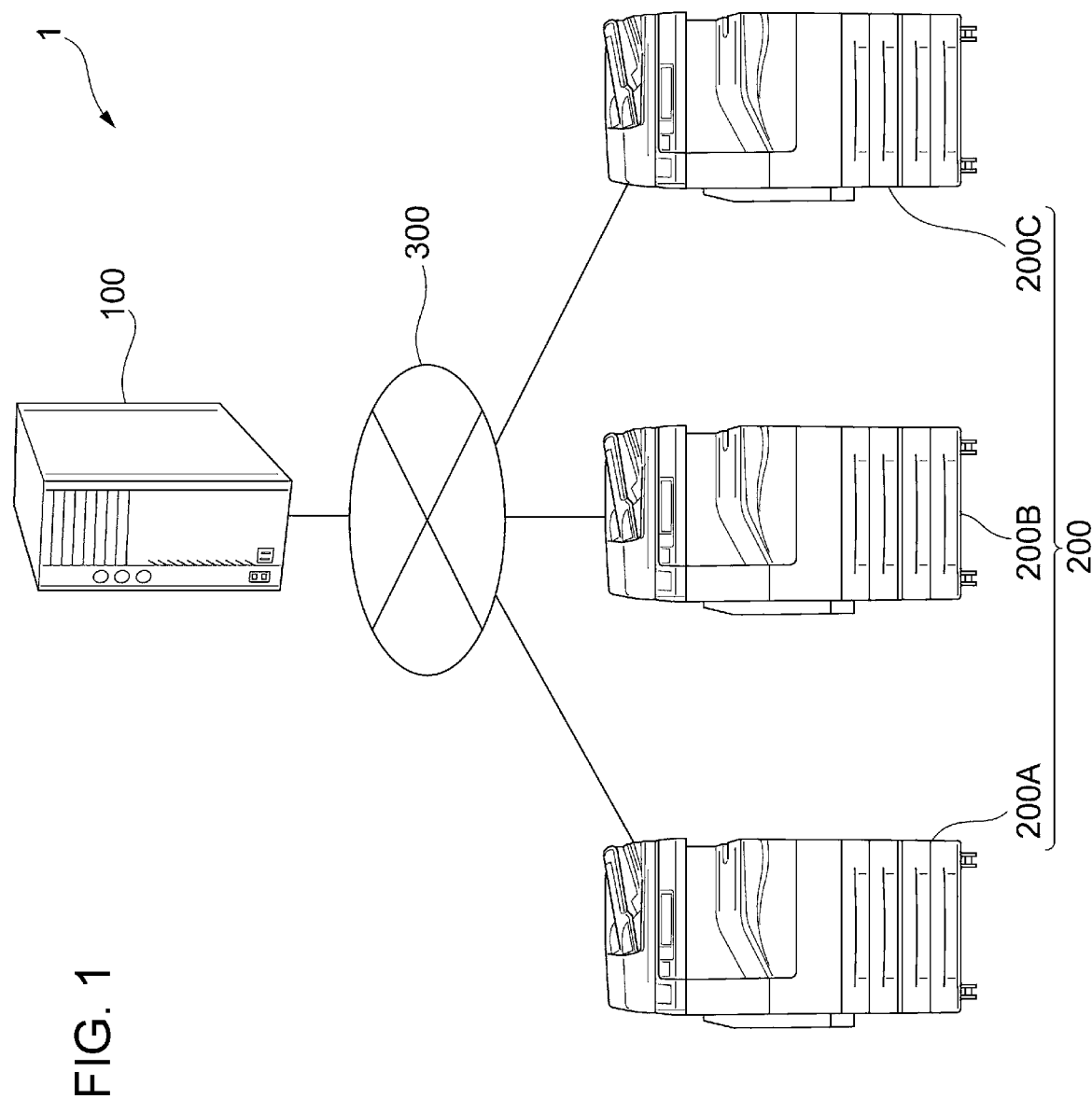
FIG. 1 illustrates an example overall configuration of a printing system according to this exemplary embodiment.

FIG. 1 illustrates an example overall configuration of a printing system 1 according to this exemplary embodiment. As illustrated in FIG. 1, the printing system 1 includes a printing management apparatus 100 and printers 200A to 200C. The printing management apparatus 100 and the printers 200A to 200C are connected to a network 300. In this exemplary embodiment, the printing management apparatus 100 is used as an example of a printing management system and a printing management apparatus.

In FIG. 1, the printers 200A to 200C are illustrated. The printers 200A to 200C are simply referred to collectively as the printers 200 and individually as the printer 200 unless they need to be distinguished from each other. While three printers 200 are illustrated in the example illustrated in FIG. 1, the number of printers 200 is not limited to three.

The printing management apparatus 100 is a computer apparatus that manages printing processes performed by the printers 200. Examples of the printing management apparatus 100 include a personal computer (PC) and a workstation. The printing management apparatus 100 determines one of the printers 200A to 200C that prints a print job or determines the order in which each of the printers 200 is to print a plurality of print jobs, by using image qualities required for printing results obtained by processing the print jobs and by using the printing characteristics of each of the printers 200.

Each print job is data that is the unit of printing processes performed by the printers 200, and includes image data to be printed and control instructions describing settings in a printing process. In this exemplary embodiment, a print job is used as an example of print information.

In this exemplary embodiment, an image quality required for a printing result obtained by processing each print job is represented as an image quality level indicating the degree of quality of an image (high or low). The image quality level may be any measure that demonstrates a degree of image quality and is expressed in two scales "high" and "low", for example. The image quality level may also be expressed as ten numbers "1" to "10", for example. In the following description, a level of image quality required for a printing result obtained by processing each print job is referred to as "required image quality level".

Moreover, the required image quality level is set in advance by a person who requests printing or is set by an operator in charge of printing by checking the content of the print job, for example. Alternatively, the printing management apparatus 100 may set the required image quality level based on information included in the print job. In this case, the printing management apparatus 100 sets the required image quality level based on, for example, the resolution of image data to be printed or the amount of the image data, or sets the required image quality level based on the type of the image data (such as text or photograph) or whether the color setting has been carried out.

Alternatively, the printing management apparatus 100 may set the required image quality level in accordance with the person who has issued the print request. For example, the required image quality level is set to be constant for print jobs requested by a person who periodically makes a request, regardless of the request.

Information on the required image quality levels, which is set in the way described above, is assigned to the respective print jobs, for example. Each print job and its required image quality level may be associated with each other, and information on the required image quality levels may be stored in a storage unit in the printing management apparatus 100 or the like. In this exemplary embodiment, a required image quality level is used as an example of image quality information.

The printers 200 are each a device that forms an image on a sheet, which is an example of a recording medium, based on a print job to print the image. Each of the printers 200 may have only a printing function or may have, in addition to the printing function, other image processing functions such as a copying function, a scanning function, and a facsimile function.

The quality of images printable by the printers 200 is determined in accordance with various factors. For example, the quality of an image printable by each of the printers 200 depends on the printing performance of the model of the printer 200. Even the same printer 200 may produce an image quality that changes before and after replacement of parts, or may produce a poor image quality due to long-time use or deterioration of parts. The image qualities may be enhanced by performing image quality adjustment of the printer 200 or by replacing wearing parts. Furthermore, the image quality may improve or deteriorate depending on the environment where the printer 200 is placed, for example, depending on the temperature or humidity at the location where the printer 200 is placed.

Image quality adjustment is a process, called calibration, for example, for correcting the quality of an image to be formed on a sheet or the like. More specifically, image quality adjustment is, for example, a process for correcting the quality of an image to be formed on a sheet or the like to a standard level. Like replacement of wearing parts, image quality adjustment may be an example of an image quality enhancement process.

In this way, the quality of an image printable by each of the printers 200 is determined in accordance with the printing performance of the printer 200 or the change in printing performance over time. In the following description, the characteristics of each of the printers 200, which determine the image quality of an image to be printed by the printer 200, are referred to as "printing characteristics". The printing characteristics include information concerning the printing performance of the printer 200 and information concerning a change in printing performance over time.

The network 300 is a communication means for use in information communication between the printing management apparatus 100 and the printers 200. Examples of the network 300 include the Internet, a public network, and a local area network (LAN).

Hardware Configuration of Printing Management Apparatus

Figure 2:
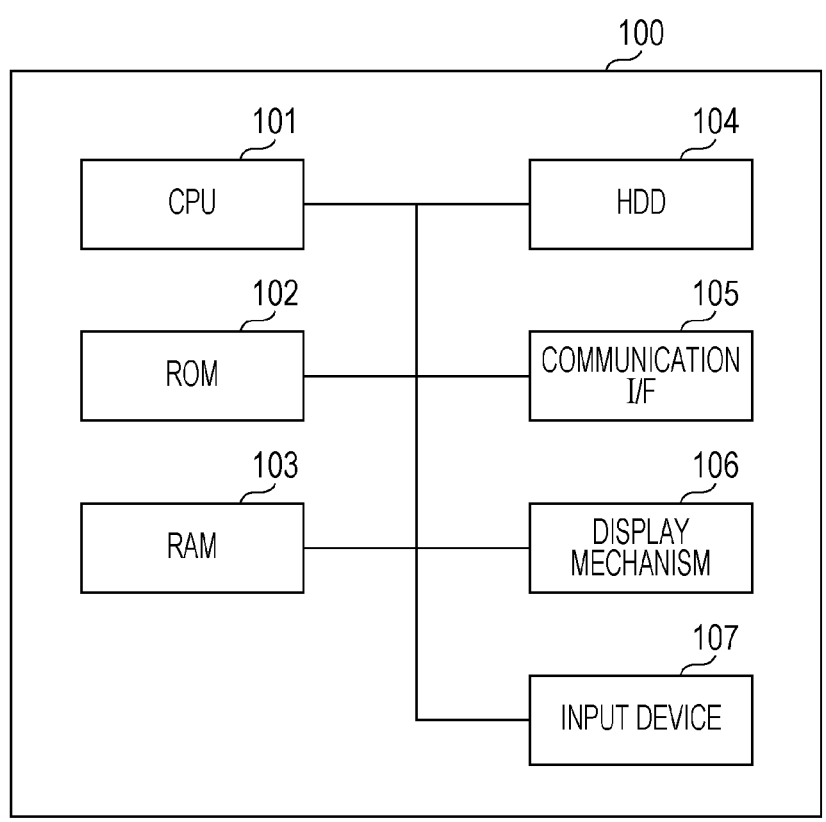
FIG. 2 illustrates an example hardware configuration of a printing management apparatus according to this exemplary embodiment.

FIG. 2 illustrates an example hardware configuration of the printing management apparatus 100 according to this exemplary embodiment.

As illustrated in FIG. 2, the printing management apparatus 100 according to this exemplary embodiment includes a central processing unit (CPU) 101, a read only memory (ROM) 102, and a random access memory (RAM) 103. The CPU 101 is an arithmetic operation means. The ROM 102 is a storage area that stores a program such as a basic input output system (BIOS). The RAM 103 is an area where the program is executed. The printing management apparatus 100 further includes a hard disk drive (HDD) 104. The HDD 104 is a storage area that stores various programs such as an operating system (OS) and applications, input data for the various programs, output data from the various programs, and so on.

The printing management apparatus 100 further includes a communication interface (communication I/F) 105 for communicating with external devices, a display mechanism 106 such as a display, and an input device 107 including a keyboard, a mouse, and a touch panel.

Functional Configuration of Printing Management Apparatus

Figure 3:
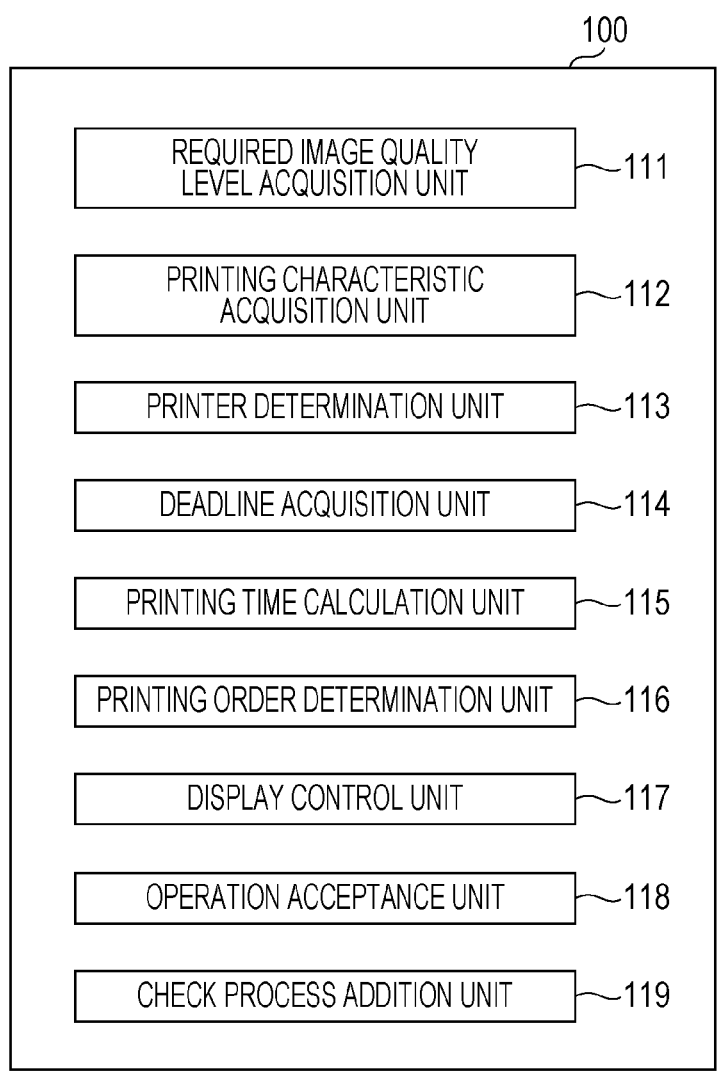
FIG. 3 is a block diagram illustrating an example functional configuration of a printing management apparatus according to this exemplary embodiment.

The functional configuration of the printing management apparatus 100 according to this exemplary embodiment will now be described. FIG. 3 is a block diagram illustrating an example functional configuration of the printing management apparatus 100 according to this exemplary embodiment. The printing management apparatus 100 according to this exemplary embodiment includes a required image quality level acquisition unit 111, a printing characteristic acquisition unit 112, a printer determination unit 113, a deadline acquisition unit 114, a printing time calculation unit 115, a printing order determination unit 116, a display control unit 117, an operation acceptance unit 118, and a check process addition unit 119.

The required image quality level acquisition unit 111, which is an example of a first acquisition unit, acquires a required image quality level for each print job. For example, when each print job is assigned a required image quality level, the required image quality level acquisition unit 111 acquires required image quality levels from the respective print jobs. For example, when a required image quality level is stored in a storage unit in association with each print job, the required image quality level acquisition unit 111 acquires the required image quality levels corresponding to the respective print jobs from the storage unit.

The printing characteristic acquisition unit 112, which is an example of a second acquisition unit, acquires printing characteristics of each of the printers 200. The printing characteristics, which are acquired by the printing characteristic acquisition unit 112, include information concerning the printing performance of the printer 200, for example, information on the model of the printer 200, the parts included in the printer 200, the resolution provided with the printer 200, and functions implementable on the printer 200. The printing characteristics, which are acquired by the printing characteristic acquisition unit 112, further include information concerning a change in the printing performance of the printer 200 over time, for example, a schedule of an image quality enhancement process such as image quality adjustment or replacement of parts or previous records. The printing characteristics further include, for example, environmental information such as the temperature or humidity at a location where the printer 200 is placed.

The printer determination unit 113, which is an example of an assignment unit, determines, for each print job, a printer 200 that prints the print job. The printer determination unit 113 assigns each of a plurality of print jobs to one of the printers 200 by using the respective required image quality levels acquired for the plurality of print jobs by the required image quality level acquisition unit 111 and by using the printing characteristics acquired for each of the printers 200 by the printing characteristic acquisition unit 112.

More specifically, the printer determination unit 113 selects, for each print job, a printer 200 that has printing performance capable of printing the print job with the image quality required by the required image quality level. When there is a plurality of printers 200 each having printing performance capable of printing a print job with the image quality required by the required image quality level, the printer determination unit 113 selects any one of the plurality of printers 200 in accordance with a predetermined standard.

Examples of the predetermined standard include a standard for selecting a printer 200 assigned print jobs, the number of which is the smallest, from among the plurality of printers 200, and a standard for selecting a printer 200 assigned print jobs which require the smallest number of sheets in total to print from among the plurality of printers 200. For example, the printer 200 having the lowest printing performance (i.e., the printer 200 with the lowest printable image quality level) may be selected from among the plurality of printers 200. Furthermore, for example, for print jobs requested by a person who periodically makes a request, the same printer 200 or printers 200 of the same model may be selected so as not to produce significantly different image qualities from print job to print job.

The deadline acquisition unit 114 acquires information on the deadline for completion of printing each print job. Each deadline is typically set by a person who makes a print request, or may be set by the operator of the printing management apparatus 100, for example. Like a required image quality level, each print job may be assigned deadline information, or deadline information may be stored in the storage unit or the like in association with each print job.

The printing time calculation unit 115 calculates, for each print job, the time expected to be taken to print the print job (hereinafter referred to as the "printing time"). The printing time calculation unit 115 calculates the printing time based on image data to be printed and print settings specified by the print job. More specifically, for example, the printing time calculation unit 115 determines the number of sheets to be used for printing based on the image data and the print settings. Then, the printing time calculation unit 115 calculates the printing time from the determined number of sheets. Since the printing speed differs depending on the printing performance of the printer 200, the printing time calculation unit 115 may calculate the printing time also by using information on the printing speed of the printer 200.

The printing order determination unit 116 is an example of a determination unit, an output unit, and an image quality adjustment adding unit. The printing order determination unit 116 determines, for each of the printers 200, the order in which the printer 200 prints print jobs (hereinafter referred to as the "printing order"). The printing order determination unit 116 acquires a required image quality level for each of the plurality of print jobs determined to be printed by the printer 200. Then, the printing order determination unit 116 determines the printing order of the plurality of print jobs by using the respective required image quality levels of the plurality of print jobs and by using the printing characteristics of the printer 200, which are acquired by the printing characteristic acquisition unit 112.

More specifically, the printing order determination unit 116 determines a change in the printing performance of the printer 200 over time by using the printing characteristics of the printer 200, namely, by using the information concerning a change in the printing performance of the printer 200 over time. Then, the printing order determination unit 116 sets a time period during which the printer 200 is guaranteed to yield high-quality printing results (hereinafter referred to as the "high-image-quality-guaranteed time period"). In other words, the high-image-quality-guaranteed time period is a time period during which images are guaranteed to be printed with quality greater than or equal to a certain level.

For example, after an image quality enhancement process such as image quality adjustment or replacement of parts is completed, the printer 200 is kept in the state of being capable of printing images with a certain or higher level of quality for a predetermined period of time. Accordingly, the printing order determination unit 116 sets, as a high-image-quality-guaranteed time period, a predetermined period of time from the time at which the image quality enhancement process such as image quality adjustment or replacement of parts is scheduled to end. Further, the printing order determination unit 116 may set a high-image-quality-guaranteed time period by, for example, specifying a time period during which the printer 200 yields high-quality printing results (or a time period during which the printer 200 is likely to yield high-quality printing results) on the basis of how the printer 200 tends to be used in a day, the environment where the printer 200 is placed, and so on. In this exemplary embodiment, the high-image-quality-guaranteed time period is used as an example of a predetermined period after completion of image quality adjustment.

Then, the printing order determination unit 116 preferentially assigns a schedule of print jobs with required image quality levels being high to the high-image-quality-guaranteed time period and determines the printing order.

The printing order determination unit 116 classifies the plurality of print jobs into two groups in accordance with the required image quality level. The two groups are a group of print jobs that are printed exclusively in the high-image-quality-guaranteed time period (hereinafter referred to as a "high-image-quality group") and a group of print jobs that are printed not exclusively in the high-image-quality-guaranteed time period (hereinafter referred to as a "low-image-quality group"). The print jobs classified as the high-image-quality group are print jobs with required image quality levels exceeding a predetermined standard. In contrast, the print jobs classified as the low-image-quality group are print jobs with required image quality levels less than or equal to the predetermined standard. The printing order determination unit 116 assigns a schedule of the print jobs classified as the high-image-quality group to the high-image-quality-guaranteed time period preferentially over a schedule of the print jobs classified as the low-image-quality group. The assignment of print job schedules is performed also by using information such as the deadline for completion of printing each print job and the printing time of each print job, for example. In the way described above, the printing order of the plurality of print jobs is determined.

The display control unit 117 is an example of a display unit. The display control unit 117 outputs data for displaying a screen on a display such as the display mechanism 106 and controls the display operation of the display. For example, the display control unit 117 displays the printing order of the plurality of print jobs, which is determined by the printing order determination unit 116.

The operation acceptance unit 118 accepts an operation of the operator. Specifically, the operation acceptance unit 118 accepts an operation performed by the operator on a screen displayed on the display such as the display mechanism 106. More specifically, for example, the operation acceptance unit 118 accepts from the operator an operation for designating a schedule of image quality adjustment.

The check process addition unit 119 is an example of a check process adding unit. The check process addition unit 119 adds, for a print job with a required image quality level exceeding a predetermined standard, a schedule of a check process for checking the image quality of a printing result obtained by processing the print job. When a schedule of the check process is added, the printing time calculation unit 115 calculates a printing time such that a process required for printing includes the check process. For example, 1 hour is expected to be taken to print a print job. In this case, 30 minutes, which is taken for the check process in the schedule, is added, and a printing time of 1 hour 30 minutes is determined.

The determination of whether each of the required image quality levels exceeds a predetermined standard is performed as follows. For example, when the required image quality levels are expressed in two scales "high" and "low", the required image quality level "high" is determined to exceed the predetermined standard. For example, when the required image quality levels are expressed as ten numbers "1" to "10", the predetermined standard is defined as "5". The print jobs classified as the high-image-quality group may be handled as those with required image quality levels exceeding a predetermined standard.

Examples of the check process include a method of printing one copy for a check before printing an intended number of copies, a method of additionally printing sample data during printing, and a method of checking the quality of a printed image by using a scanning function. If it is determined in the check process that the quality of a printed image does not reach the required image quality level, the printer 200 outputs a warning and notifies the operator that the required image quality level is not reached. The operator performs image quality adjustment of the printer 200 or the printer 200 corrects data of the print job, printing-related parameters, or the like before the printer 200 re-prints an image. In addition, the printer 200 may suspend printing of the current print job and continue printing of the subsequent print job.

The functional units included in the printing management apparatus 100 are implemented by causing software and hardware resources to cooperate with each other. Specifically, for example, when the printing management apparatus 100 is implemented using the hardware configuration illustrated in FIG. 2, various programs stored in the HDD 104 or the like are read into the RAM 103 and are executed by the CPU 101 to implement the functional units illustrated in FIG. 3, such as the required image quality level acquisition unit 111, the printing characteristic acquisition unit 112, the printer determination unit 113, the deadline acquisition unit 114, the printing time calculation unit 115, the printing order determination unit 116, the display control unit 117, the operation acceptance unit 118, and the check process addition unit 119.

Procedure of Printing Order Determination Process

Figure 4A:
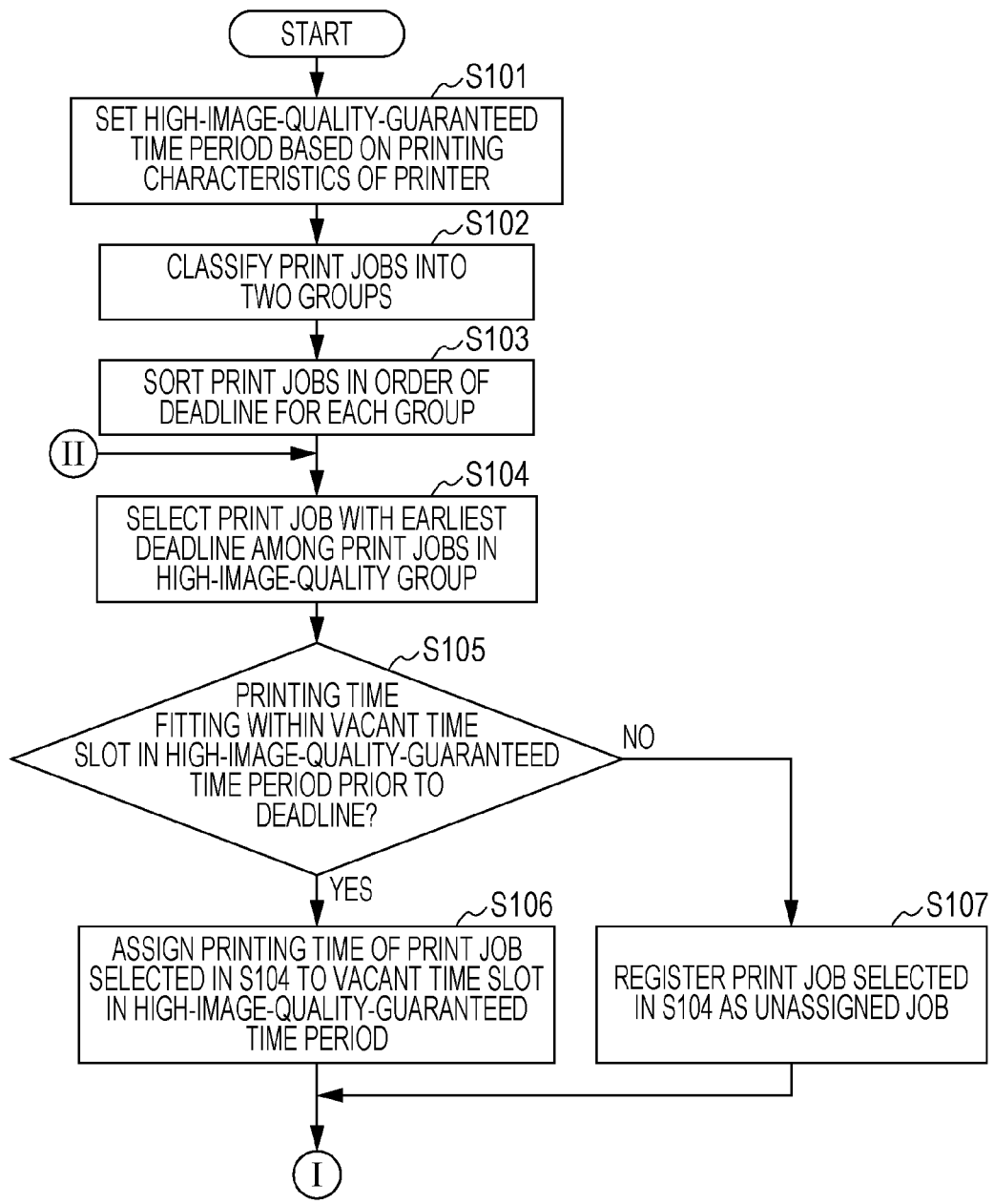
FIGS. 4A and 4B are a flowchart illustrating an exemplary procedure of a printing order determination process.
Figure 4B:
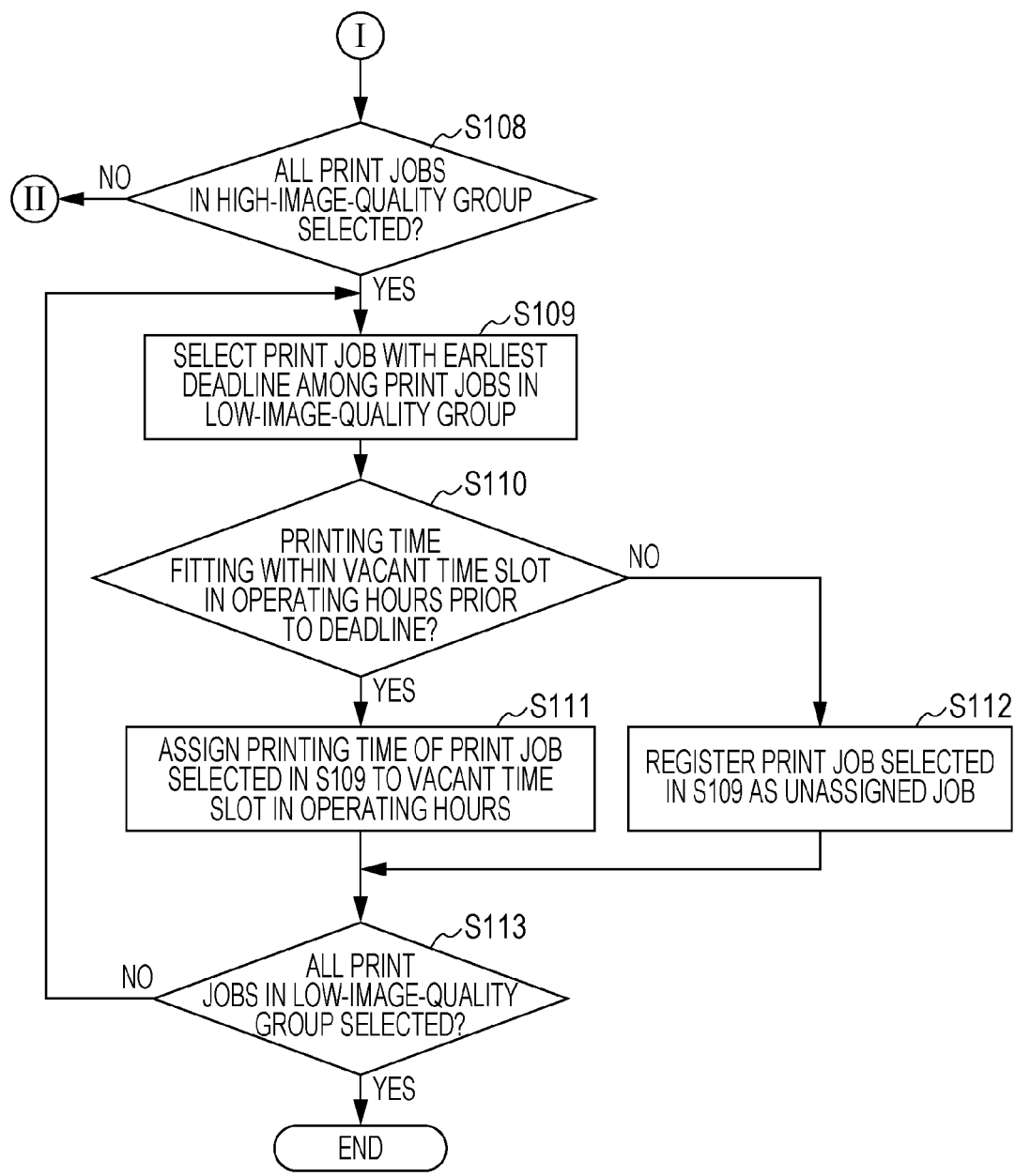

The procedure of a printing order determination process performed by the printing order determination unit 116 will now be described. FIGS. 4A and 4B are a flowchart illustrating an exemplary procedure of the printing order determination process. In the illustrated example, the printing order of a plurality of print jobs assigned to the printer 200A is determined.

Before performing the processing of steps described below (hereinafter, each step may be represented as symbol "S"), the printing order determination unit 116 acquires, for each of the plurality of print jobs, the required image quality level acquired by the required image quality level acquisition unit 111, the deadline acquired by the deadline acquisition unit 114, and the printing time calculated by the printing time calculation unit 115. Note that various pieces of information are not necessarily acquired before the processing of the steps. For example, each time the processing of a step requires information, the information may be acquired.

First, the printing order determination unit 116 sets a high-image-quality-guaranteed time period on the basis of the printing characteristics of the printer 200A (S101). For example, the printing order determination unit 116 sets a high-image-quality-guaranteed time period on the basis of the scheduled end time of a process such as image quality adjustment or replacement of parts, which is acquired by the printing characteristic acquisition unit 112. If there is a plurality of scheduled items of image quality adjustment or replacement of parts, a high-image-quality-guaranteed time period is set for each of the scheduled items.

Then, the printing order determination unit 116 classifies the plurality of print jobs into two groups in accordance with the required image quality levels of the plurality of print jobs (S102).

For example, when the required image quality levels are expressed in two scales "high" and "low", print jobs with required image quality levels being "high" are classified as the high-image-quality group, and print jobs with required image quality levels being "low" are classified as the low-image-quality group. For example, when the required image quality levels are expressed as ten numbers "1" to "10", print jobs with required image quality levels in the range of "8" to "10" are classified as the high-image-quality group, and print jobs with required image quality levels in the range of "1" to "7" are classified as the low-image-quality group.

Then, the printing order determination unit 116 sorts, for each of the groups into which the print jobs are classified, the print jobs in order of deadline (S103). The printing order determination unit 116 arranges, for each of the groups into which the print jobs are classified, the print jobs in ascending order of deadline (earliest deadline first). Then, the printing order determination unit 116 selects the print job with the earliest deadline among the print jobs included in the high-image-quality group (S104). Here, the printing order determination unit 116 selects the print job with the earliest deadline from among unselected print jobs other than already selected print jobs.

Then, the printing order determination unit 116 determines whether the printing time of the print job selected in S104 fits within a vacant time slot in the high-image-quality-guaranteed time period of the printer 200A prior to the deadline (S105). If an affirmative determination (YES) is made in S105, the printing order determination unit 116 assigns the printing time of the print job selected in S104 to the vacant time slot in the high-image-quality-guaranteed time period (S106). Here, the printing order determination unit 116 assigns the printing time to the earliest time frame into which the printing time fits within the vacant time slot in the high-image-quality-guaranteed time period.

On the other hand, if a negative determination (NO) is made in S105, the printing order determination unit 116 registers the print job selected in S104 as an unassigned print job (hereinafter referred to as an "unassigned job") (S107).

It should be noted that the unassigned job is a print job whose printing time has not been assigned to operating hours of the printer 200. The operating hours of the printer 200 are a time period during which the printer 200 can perform printing. The operating hours include a high-image-quality-guaranteed time period and a time period other than the high-image-quality-guaranteed time period. In the high-image-quality group, an unassigned job is a print job whose printing time has not been assigned to the high-image-quality-guaranteed time period.

Then, the printing order determination unit 116 determines whether all of the print jobs in the high-image-quality group have been selected (S108). If a negative determination (NO) is made in S108, the process returns to S104. On the other hand, if an affirmative determination (YES) is made in S108, the printing order determination unit 116 selects the print job with the earliest deadline among the print jobs included in the low-image-quality group (S109). Here, the printing order determination unit 116 selects the print job with the earliest deadline from among unselected print jobs other than already selected print jobs.

Then, the printing order determination unit 116 determines whether the printing time of the print job selected in S109 fits within a vacant time slot in the operating hours of the printer 200A prior to the deadline (S110). If an affirmative determination (YES) is made in S110, the printing order determination unit 116 assigns the printing time of the print job selected in S109 to the vacant time slot in the operating hours (S111). Here, the printing order determination unit 116 assigns the printing time to the earliest time frame into which the printing time fits within the vacant time slot in the operating hours. On the other hand, if a negative determination (NO) is made in S110, the printing order determination unit 116 registers the print job selected in S109 as an unassigned job (S112).

Then, the printing order determination unit 116 determines whether all of the print jobs in the low-image-quality group have been selected (S113). If a negative determination (NO) is made in S113, the process returns to S109. On the other hand, if an affirmative determination (YES) is made in S113, this process flow ends.

In the example described above, in S104, the printing order determination unit 116 selects the print job with the earliest deadline. However, this embodiment is not limited to this example.

For example, in S104, the printing order determination unit 116 may select the print job with the highest required image quality level. That is, the printing order determination unit 116 may preferentially assign a print job with a high required image quality level to the high-image-quality-guaranteed time period. Here, the deadline and the required image quality level may be regarded as examples of priority information for determining the degree of priority of a print job. The printing order determination unit 116 may be configured to assign the printing times of the print jobs in the high-image-quality group to the high-image-quality-guaranteed time period in accordance with priority information corresponding to the print jobs.

Alternatively, for example, in S104, the printing order determination unit 116 may randomly select a print job without using the deadlines or the required image quality levels.

The processing of S109 can also be considered in a way similar to that in the processing of S104.

Description of Information Concerning Change in Printing Performance of Printer Over Time Then, the information concerning a change in the printing performance of the printer 200 over time will be described with reference to a specific example. As described above, the information concerning a change in the printing performance of the printer 200 over time includes, for example, a schedule of an image quality enhancement process such as image quality adjustment or replacement of parts. Here, a schedule of image quality adjustment will be described as an example.

FIG. 5 illustrates an exemplary screen for receiving addition of a schedule of image quality adjustment.

The "subject" represents the title for a schedule item to be registered. The "target period" represents the period for the schedule item to be registered. In the illustrated example, the target period is from Mar. 11, 2018 to Mar. 11, 2019. Further, the "register as regular schedule item" checkbox 11 is marked with a check. Thus, image quality adjustment is scheduled at regular intervals in the period from Mar. 11, 2018 to Mar. 11, 2019.

The "target day" represents the day on which the schedule item to be registered is held, and the "target time" represents the start time of the schedule item to be registered. The "required time period" represents the time period required for image quality adjustment to be registered. In the illustrated example, image quality adjustment scheduled for every Monday, Wednesday, and Friday from 8:00 to 8:15 is registered. In addition, a high-image-quality-guaranteed time period is also registered on this screen. In the illustrated example, a time period of 5 hours 30 minutes after completion of the image quality adjustment is registered as a high-image-quality-guaranteed time period. In other words, a time frame of 5 hours 30 minutes is registered as a high-image-quality-guaranteed time period for the scheduled image quality adjustment.

Figure 6:
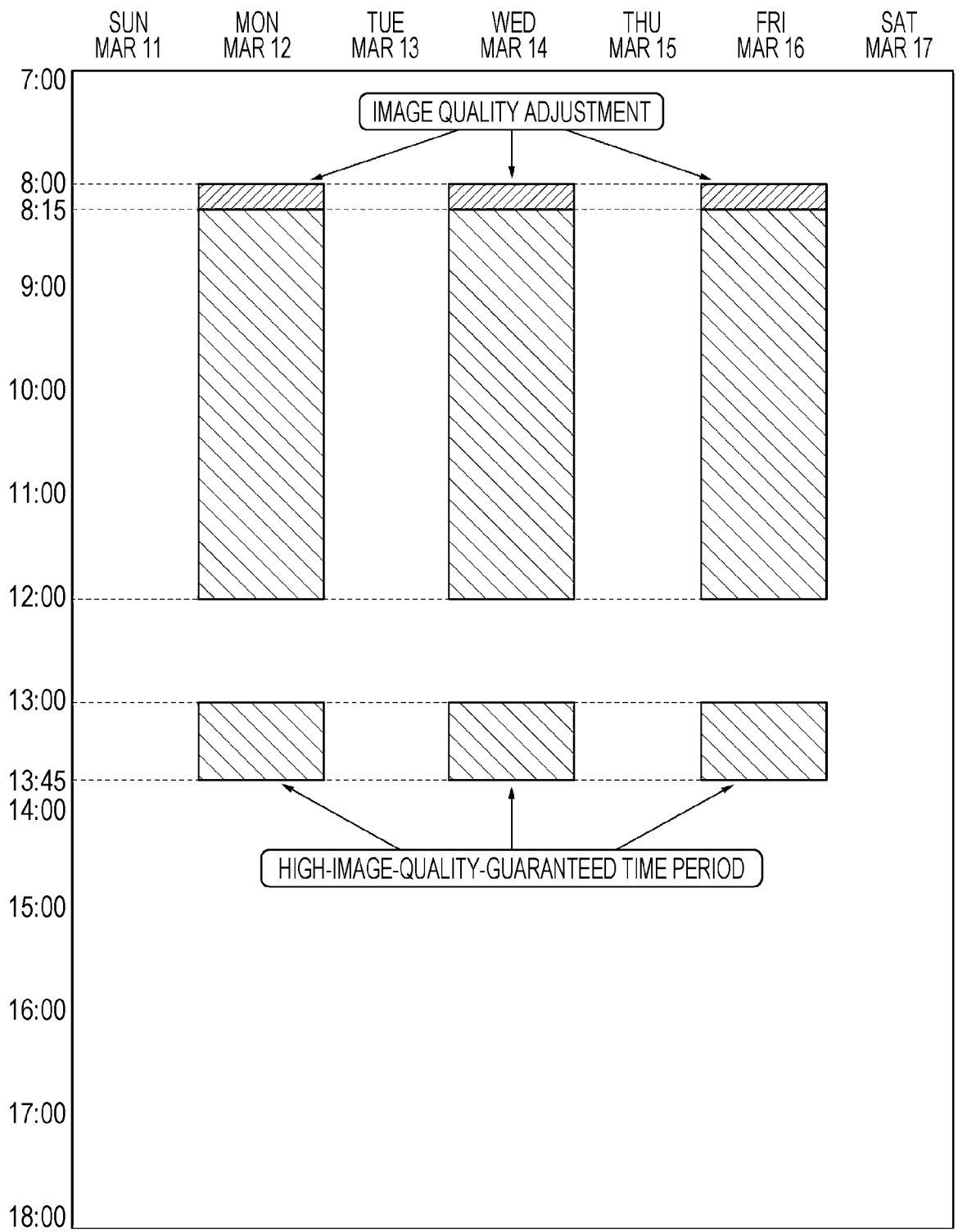
FIG. 6 illustrates an exemplary screen showing scheduled image quality adjustment and high-image-quality-guaranteed time periods.

FIG. 6 illustrates an exemplary screen showing scheduled image quality adjustment and high-image-quality-guaranteed time periods. When the operator performs setting in the manner illustrated in FIG. 5 and selects an "OK" button 12 (see FIG. 5), then, as illustrated in FIG. 6, a screen showing scheduled image quality adjustment and high-image-quality-guaranteed time periods is displayed.

For example, image quality adjustment scheduled for March 12 (Monday), March 14 (Wednesday), and March 16 (Friday) from 8:00 to 8:15 is registered. Further, high-image-quality-guaranteed time periods are each registered as a time frame of 5 hours 30 minutes from 8:15, which is the scheduled end time of each image quality adjustment, that is, in the time frame from 8:15 to 13:45.

The time period from 12:00 to 13:00 is set as a non-operating hour range of the printer 200 in advance, and no printing is performed during this time period. It should be noted that, in the illustrated example, the time periods from 8:00 to 12:00 and 13:00 to 18:00 on weekdays are set as operating hours in advance by the operator or the like.

In the example illustrated in FIG. 6, furthermore, the week from March 11 to March 17 is illustrated. Since the target period is from Mar. 11, 2018 to Mar. 11, 2019 (see FIG. 5), image quality adjustment is also scheduled for Monday, Wednesday, and Friday in the subsequent weeks, and the high-image-quality-guaranteed time periods on Monday, Wednesday, and Friday in the subsequent weeks are also registered.

In the example illustrated in FIG. 5, furthermore, the operator designates the duration of the high-image-quality-guaranteed time period. Alternatively, the duration of the high-image-quality-guaranteed time period may be set in advance. In this case, when the operator designates a schedule of a process such as image quality adjustment or replacement of parts, the printing order determination unit 116 sets a predetermined required time period from the scheduled end time of the process as a high-image-quality-guaranteed time period. The duration of the high-image-quality-guaranteed time period may be set in association with an image quality enhancement process such as image quality adjustment or replacement of parts.

For example, if it is ensured that a certain or higher level of image quality in printing is maintained until the number of sheets used reaches a threshold value, the duration of the high-image-quality-guaranteed time period can be regarded as the duration required for the printing of a predetermined number of sheets. The duration of the high-image-quality-guaranteed time period changes in accordance with the printing performance of the printer 200 and is thus included in the information concerning the printing performance of the printer 200.

Specific Example of Printing Order Determination Process

The printing order determination process will now be described with reference to a specific example. The following describes the determination of the order of printing for the printer 200A. Each print job is assumed to be continuously printed, with a single print job not being printed during a time period with the non-operating hour range of the printer 200A in between. The steps described below correspond to the steps in FIGS. 4A and 4B.

FIGS. 7A and 7B illustrate an example of print jobs to be printed by the printer 200A. As illustrated in FIG. 7A, in the illustrated example, the print jobs to be printed by the printer 200A include jobs A to O. Further, the required image quality levels are expressed in two scales "high" and "low". Print jobs with required image quality levels being "high" are classified as a high-image-quality group, and print jobs with required image quality levels being "low" are classified as a low-image-quality group. That is, six print jobs, namely, the jobs A, C, G to I, and M, are classified as the high-image-quality group, and the other print jobs are classified as the low-image-quality group. Furthermore, the printing time of each print job and information on the deadline of each print job are acquired.

First, the printing order determination unit 116 sets a high-image-quality-guaranteed time period on the basis of the printing characteristics of the printer 200A (S101). In the illustrated example, it is assumed that image quality adjustment is scheduled and high-image-quality-guaranteed time periods are set in the manner illustrated in FIG. 6. Then, the printing order determination unit 116 classifies the print jobs, namely, the jobs A to O, into the high-image-quality group and the low-image-quality group (S102).

Then, the printing order determination unit 116 sorts, for each group, the print jobs in order of deadline (S103). FIG. 7B illustrates sorting results obtained by the printing order determination unit 116. As illustrated in FIG. 7B, in the high-image-quality group, the six print jobs, namely, the jobs A, C, G to I, and M, are sorted in order of deadline. In the low-image-quality group, the other print jobs are sorted in order of deadline. Among print jobs having the same deadline, such as the jobs G and H, a print job to be given priority is determined in accordance with a predetermined standard. For example, a print job requested earlier is given priority. Alternatively, a print job to be given priority may be determined in accordance with the importance of the print job.

Figures 8A, 8B:
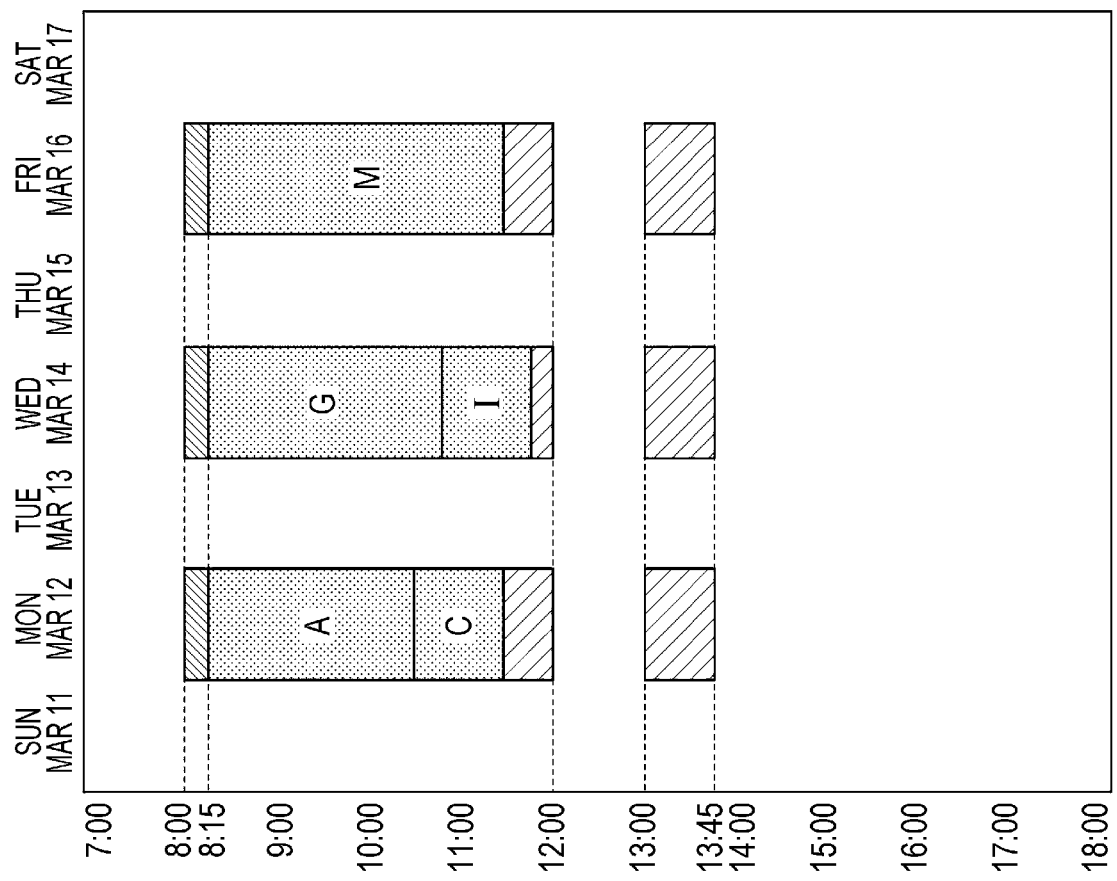
FIGS. 8A and 8B illustrate an exemplary assignment of the printing times of print jobs in a high-image-quality group to high-image-quality-guaranteed time periods.

Then, the printing order determination unit 116 selects the print jobs in the high-image-quality group in ascending order of deadline (earliest deadline first) and assigns the printing times to vacant time slots in the high-image-quality-guaranteed time periods illustrated in FIG. 6. FIGS. 8A and 8B illustrate an exemplary assignment of the printing times of the print jobs in the high-image-quality group to high-image-quality-guaranteed time periods. FIG. 8A illustrates time slots to which the printing times of the print jobs in the high-image-quality group have been assigned, and FIG. 8B illustrates a table of results indicating whether assignment of each of the print jobs in the high-image-quality group is successful.

Here, the printing order determination unit 116 selects the job A, which is the print job with the earliest deadline, from within the high-image-quality group (S104). The printing time of the job A is 2 hours and the deadline of the job A is March 12. At this point in time, the high-image-quality-guaranteed time period on March 12 has a vacant time slot from 8:15 to 12:00 and from 13:00 to 13:45. The printing time of the job A fits within the vacant time slot in the high-image-quality-guaranteed time period prior to the deadline (YES in S105). Thus, the printing order determination unit 116 assigns the printing time of the job A to the vacant time slot in the high-image-quality-guaranteed time period (S106). Here, as illustrated in FIG. 8A, the printing order determination unit 116 assigns the printing time of the job A to a time frame from 8:15 to 10:15 on March 12.

Then, the printing order determination unit 116 selects the job C, which is the print job with the next earliest deadline after the job A, from within the high-image-quality group.

As illustrated in FIG. 8A, the printing time of the job C is assigned to a time frame from 10:15 to 11:15 on March 12.

Then, the printing order determination unit 116 selects the job G, which is the print job with the next earliest deadline after the job C, from within the high-image-quality group. The printing time of the job G is 2.5 hours and the deadline of the job G is March 14. At this point in time, the high-image-quality-guaranteed time period on March 12 has a vacant time slot from 11:15 to 12:00 and from 13:00 to 13:45. The printing time of the job G does not fit within the vacant time slot in the high-image-quality-guaranteed time period on March 12. The high-image-quality-guaranteed time period on March 14 has a vacant time slot from 8:15 to 12:00 and from 13:00 to 13:45. Thus, as illustrated in FIG. 8A, the printing time of the job G is assigned to a time frame from 8:15 to 10:45 on March 14.

Then, the printing order determination unit 116 selects the job H, which is the print job with the next earliest deadline after the job G, from within the high-image-quality group. The printing time of the job H is 1.5 hours and the deadline of the job H is March 14. At this point in time, the high-image-quality-guaranteed time period on March 12 has a vacant time slot from 11:15 to 12:00 and from 13:00 to 13:45. Further, the high-image-quality-guaranteed time period on March 14 has a vacant time slot from 10:45 to 12:00 and from 13:00 to 13:45. The printing time of the job H does not fit within the vacant time slot in the high-image-quality-guaranteed time period prior to March 14, which is the deadline (NO in S105). Then, the printing order determination unit 116 registers the job H as an unassigned job (S107).

The printing times of the print jobs in the high-image-quality group are assigned sequentially in the way described above. Then, as illustrated in FIG. 8A, a screen showing time slots in which image quality adjustment is scheduled and time slots in which a plurality of print jobs are scheduled is displayed. Further, as illustrated in FIG. 8B, the results indicating whether assignment of the print jobs in the high-image-quality group is successful are displayed as a list. Since the jobs A, C, G, I, and M have been assigned to the high-image-quality-guaranteed time periods, the results are "OK". Since the job H is an unassigned job, the result is "NG".

At the point in time when the printing time of the job M is assigned, the time frame from 11:15 to 12:00 in the high-image-quality-guaranteed time period on March 12 remains vacant. For example, if job P whose deadline is March 20 and whose printing time is 30 minutes is present as a print job in the high-image-quality group, the printing time of the job P is assigned to a time frame from 11:15 to 11:45 on March 12. The job P is a print job whose deadline is later than the deadlines of the jobs G, I, and M, but is assigned to a time frame earlier than the time frames to which the jobs G, I, and M are assigned.

Figures 9A, 9B:
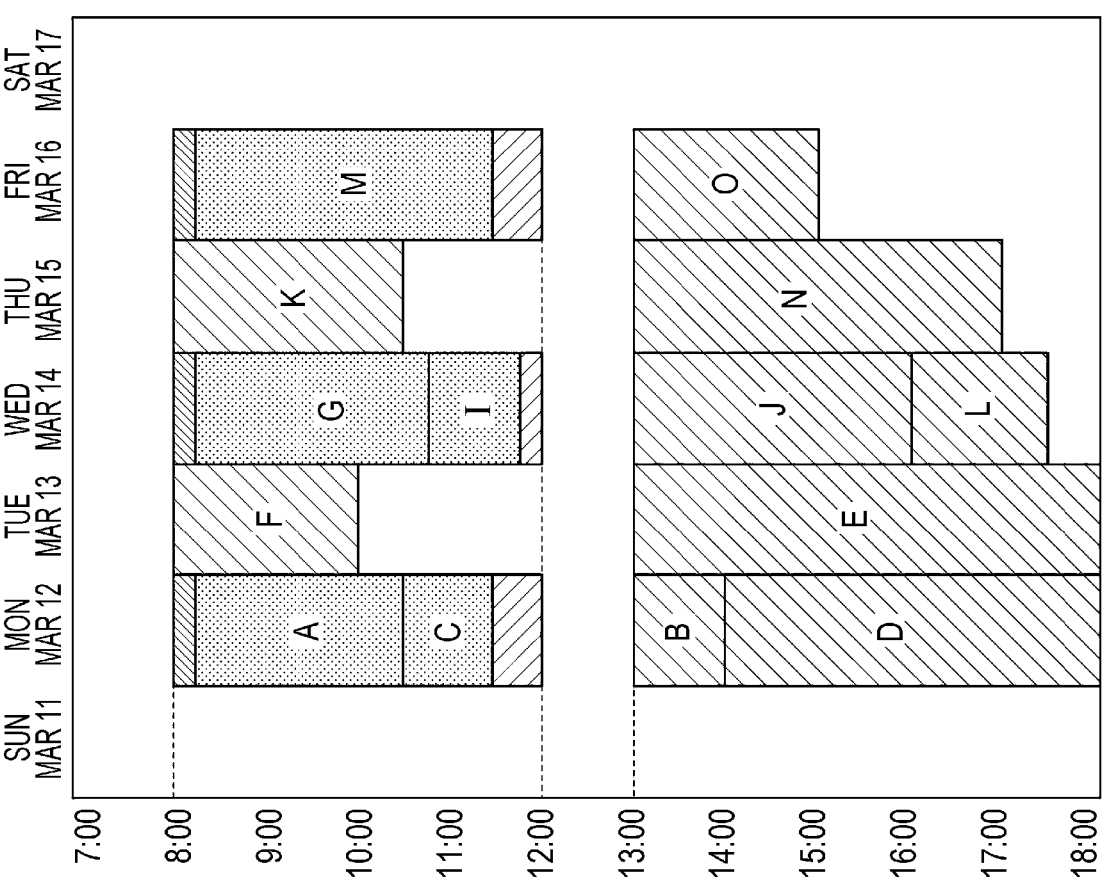
FIGS. 9A and 9B illustrate an exemplary assignment of the printing times of all print jobs to operating hours.

Then, after all the print jobs in the high-image-quality group have been assigned (YES in S108), the printing order determination unit 116 selects the print jobs in the low-image-quality group in ascending order of deadline (earliest deadline first) and assigns the printing times to vacant time slots in the operating hours of the printer 200A. FIGS. 9A and 9B illustrate an exemplary assignment of the printing times of all the print jobs to the operating hours. FIG. 9A illustrates time slots to which the printing times of the print jobs have been assigned, and FIG. 9B illustrates a table of results indicating whether assignment of each of the print jobs is successful.

The print jobs in the low-image-quality group are also assigned in a way similar to that in the assignment of the print jobs in the high-image-quality group. Whereas the print jobs in the high-image-quality group are assigned to vacant time slots in the high-image-quality-guaranteed time periods, the print jobs in the low-image-quality group are assigned to vacant time slots in the operating hours including the high-image-quality-guaranteed time periods.

Here, the printing order determination unit 116 selects the job B, which is the print job with the earliest deadline, from within the low-image-quality group (S109). The printing time of the job B is 1 hour and the deadline of the job B is March 12. At this point in time, the operating hours on March 12 have a vacant time slot from 11:15 to 12:00 and from 13:00 to 18:00. The printing time of the job B fits within the vacant time slot in the operating hours prior to the deadline (YES in S110). Thus, the printing order determination unit 116 assigns the printing time of the job B to a time frame from 13:00 to 14:00 on March 12.

The printing times of the subsequent print jobs are also assigned in the operating hours of the printer 200A in a similar way.

In the way described above, the printing times of all the print jobs, including the print jobs in the low-image-quality group, are assigned sequentially. Then, as illustrated in FIG. 9A, a screen showing time slots in which image quality adjustment is scheduled and time slots in which a plurality of print jobs are scheduled is displayed. Further, as illustrated in FIG. 9B, the results indicating whether assignment of each of the print jobs is successful are displayed as a list. Since the print jobs other than the job H are successfully assigned in the operating hours of the printer 200A, the results are "OK", whereas the result of only the job H is "NG".

The display control unit 117 may display a screen showing a list of unassigned jobs. FIG. 10 illustrates an exemplary list screen of unassigned jobs. In the example illustrated in FIG. 10, three print jobs, namely, jobs H, X, and Y, are registered as unassigned jobs. For example, the operator selects an unassigned job on the list screen of unassigned jobs to manually assign the printing time of the selected unassigned job in the operating hours of the printer 200. Additionally, unassigned jobs in the high-image-quality group and unassigned jobs in the low-image-quality group may be classified and displayed or may be displayed on separate screens.

Further, each unassigned job is not limited to a print job that fails to be assigned when the printing order determination unit 116 determines the printing order. For example, a print job that it is yet to be determined whether to actually print or a print job that is printed at an undefined time in the future may be registered as an unassigned job.

Addition of Schedule of Image Quality Enhancement Process

The following describes addition of a schedule of an image quality enhancement process such as image quality adjustment or replacement of parts. The printing order determination unit 116 may add a schedule of an image quality enhancement process if the print jobs classified as the high-image-quality group include an unassigned job whose printing time has not been assigned to a high-image-quality-guaranteed time period. The addition of a schedule of an image quality enhancement process generates a new high-image-quality-guaranteed time period. The printing order determination unit 116 then assigns the printing time of the unassigned job in the high-image-quality group to the new high-image-quality-guaranteed time period. Here, a schedule of image quality adjustment will be described as an exemplary schedule of an image quality enhancement process.

Figure 11A:
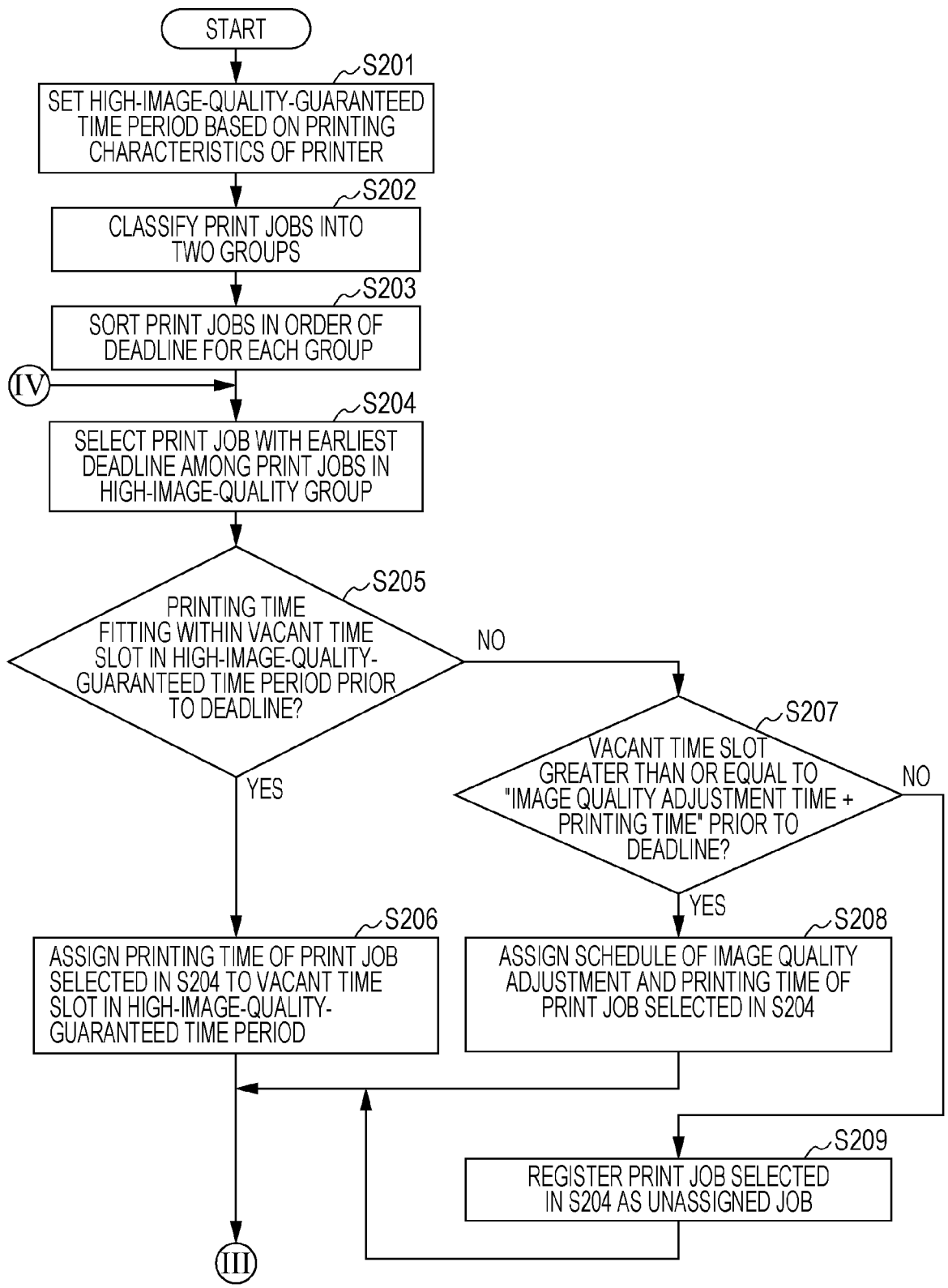
FIGS. 11A and 11B are a flowchart illustrating an exemplary procedure of a process for adding a schedule of image quality adjustment.
Figure 11B:
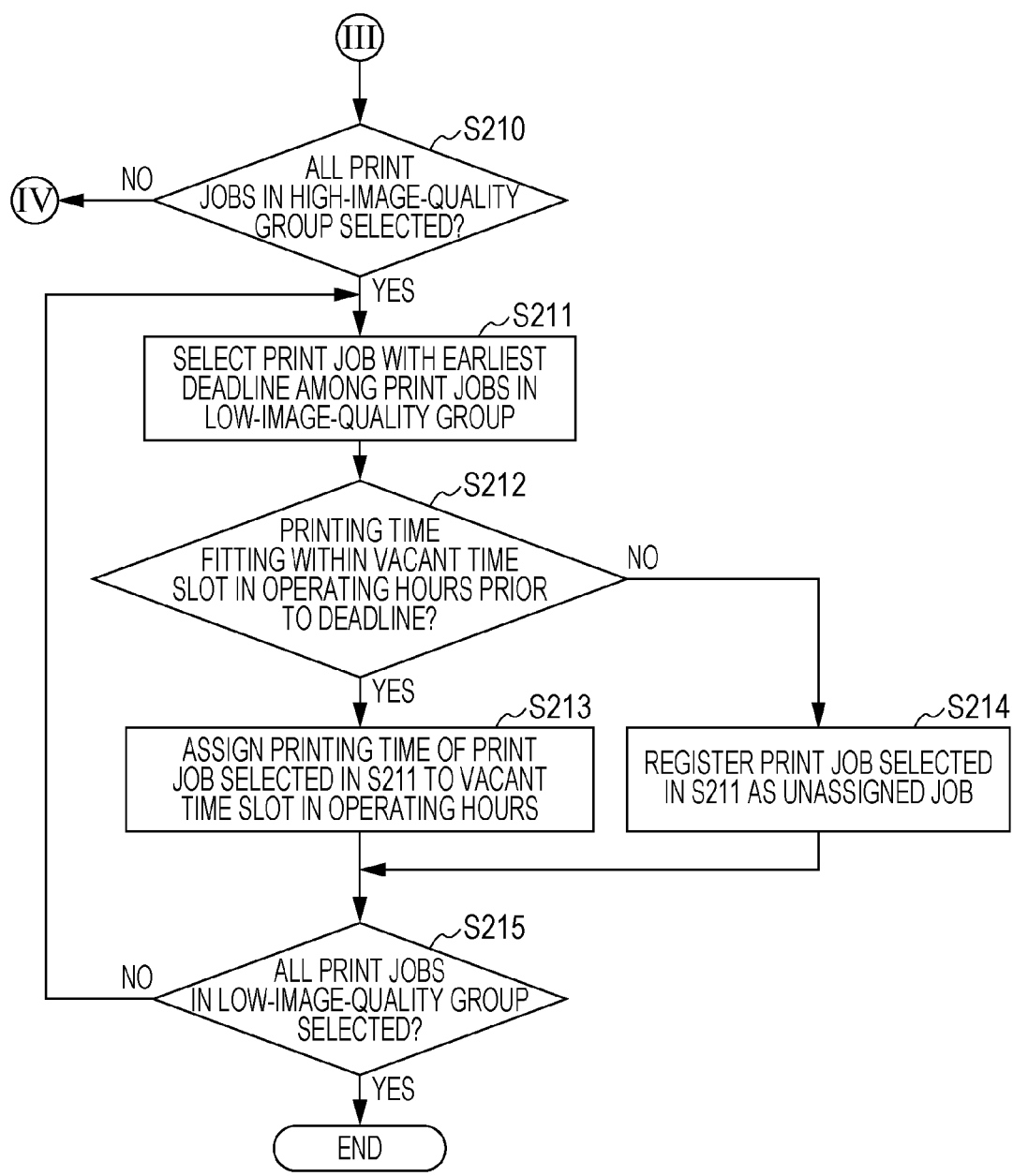

FIGS. 11A and 11B are a flowchart illustrating an exemplary procedure of a process for adding a schedule of image quality adjustment. In the illustrated example, as in FIGS. 4A and 4B, the printing order of a plurality of print jobs assigned to the printer 200A is determined.

The processing of S201 to S206 is similar to the processing of S101 to S106 in FIG. 4A and will not be described herein.

If a negative determination (NO) is made in S205, that is, if it is determined that the printing time of the print job selected in S204 does not fit within the vacant time slot in the high-image-quality-guaranteed time period of the printer 200A prior to the deadline, the processing of S207 is performed.

In S207, the printing order determination unit 116 determines whether the vacant time slot in the operating hours of the printer 200A includes, prior to the deadline of the print job selected in S204, a time frame greater than or equal to "the time taken for image quality adjustment+the printing time (i.e., the printing time of the print job selected in S204)" (S207).

If an affirmative determination (YES) is made in S207, the printing order determination unit 116 extracts a time frame equal to "the time taken for image quality adjustment+the printing time" from the vacant time slot and assigns the schedule of image quality adjustment and the printing time of the print job selected in S204 to the extracted time frame (S208). The printing order determination unit 116 adds a schedule of image quality adjustment to generate a new high-image-quality-guaranteed time period.

On the other hand, if a negative determination (NO) is made in S207, the printing order determination unit 116 registers the print job selected in S204 as an unassigned job (S209).

The processing of S210 to S215 is similar to the processing of S108 to S113 in FIG. 4B and will not be described herein. Then, this process flow ends.

In S208, the printing order determination unit 116 extracts a time frame equal to "the time taken for image quality adjustment+the printing time" prior to the deadline from the vacant time slot in the operating hours of the printer 200A. Alternatively, the printing order determination unit 116 may extract any time frame from vacant time slots prior to the deadline.

When a print job with an early deadline is printed preferentially, however, the printing order determination unit 116 extracts a time frame equal to "the time taken for image quality adjustment+the printing time" from a vacant time slot after the printing time of the print job assigned immediately before the print job selected in S204. If the vacant time slot does not include a time frame equal to "the time taken for image quality adjustment+the printing time", the printing order determination unit 116 extracts a time frame equal to "the time taken for image quality adjustment+the printing time" from a vacant time slot before the printing time of the print job assigned immediately before the print job selected in S204.

If the print jobs classified as the high-image-quality group include an unassigned job whose printing time has not been assigned to the high-image-quality-guaranteed time period, the printing order determination unit 116 may output a request for an additional schedule of image quality adjustment. For example, the printing order determination unit 116 displays a screen showing a request for an additional schedule of image quality adjustment or notifies the operator of a request for an additional schedule of image quality adjustment by email.

Specific Example of Process for Adding Schedule of Image Quality Adjustment

The process for adding a schedule of image quality adjustment will now be described with reference to a specific example. It is assumed here that a schedule of image quality adjustment is added when the printing order of the jobs A to O illustrated in FIGS. 7A and 7B is determined as the order of printing for the printer 200A. The time taken for image quality adjustment is set as 15 minutes in advance.

Figures 12A, 12B:
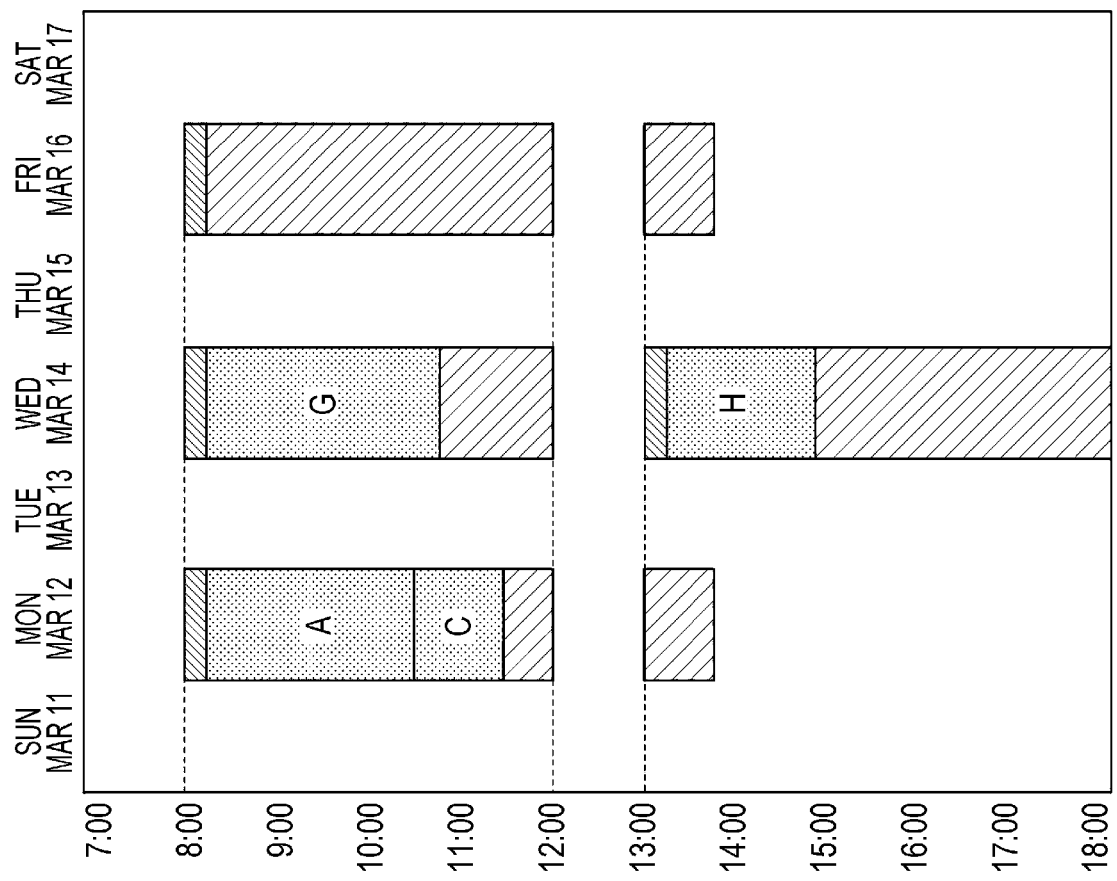

FIGS. 12A to 12F illustrate an exemplary process for adding a schedule of image quality adjustment. First, as illustrated in FIG. 12A, the printing times of the jobs A, C, and G are assigned sequentially in a way similar that in the example illustrated in FIG. 8A. Then, in the example illustrated in FIG. 8A, the job H is registered as an unassigned job. In the example illustrated in FIGS. 12A to 12F, in contrast, the printing order determination unit 116 determines whether the vacant time slot in the operating hours of the printer 200A includes, prior to the deadline of the job H, a time frame greater than or equal to "the time taken for image quality adjustment+the printing time (i.e., the printing time of the job H)".

The time taken for image quality adjustment is 15 minutes, and the printing time of the job H is 1 hour 30 minutes. Further, the deadline of the job H is March 14. Thus, the printing order determination unit 116 determines whether the vacant time slot on or before March 14 includes a time frame greater than or equal to 1 hour 45 minutes. To preferentially print a print job with an early deadline, vacant time slots after the printing time of the job G, which has been assigned immediately before the job H, are searched. Then, at this point in time, the vacant time slot on March 14 is from 10:45 to 12:00 and from 13:00 to 18:00. Thus, the printing order determination unit 116 extracts a time frame of 1 hour 45 minutes from 13:00 and assigns the schedule of image quality adjustment and the printing time of the job H to the extracted time frame.

The addition of a schedule of image quality adjustment from 13:00 to 13:15 generates a high-image-quality-guaranteed time period of 5 hours 30 minutes from 13:15 (i.e., from 13:15 to 18:45). Since the operating hours of the printer 200A end at 18:00, the time period from 13:15 to 18:00 is set as a high-image-quality-guaranteed time period. Further, the printing order determination unit 116 assigns the printing time of the job H to a time frame from 13:15 to 14:45. As illustrated in FIG. 12B, the result for the job H becomes "OK".

Then, the printing order determination unit 116 selects the job I, which is the print job with the next earliest deadline after the job H, from within the high-image-quality group. As illustrated in FIG. 12C, the printing time of the job I is assigned to the same time slot as that in FIG. 8A.

Then, the printing order determination unit 116 selects the job M, which is the print job with the next earliest deadline after the job I, from within the high-image-quality group. The printing time of the job M is 3 hours and the deadline of the job M is March 16. In the example illustrated in FIG. 8A, the job M is assigned to March 16. In the example illustrated in FIGS. 12A to 12F, in contrast, a time frame from 14:45 to 18:00 in the high-image-quality-guaranteed time period on March 14 remains vacant. Thus, as illustrated in FIG. 12C, the printing order determination unit 116 assigns the printing time of the job M to a time frame from 14:45 to 17:45.

In the way described above, all the print jobs in the high-image-quality group, including the job H, are assigned to the high-image-quality-guaranteed time period. Thus, as illustrated in FIG. 12D, the results are "OK".

Figures 12E, 12F:
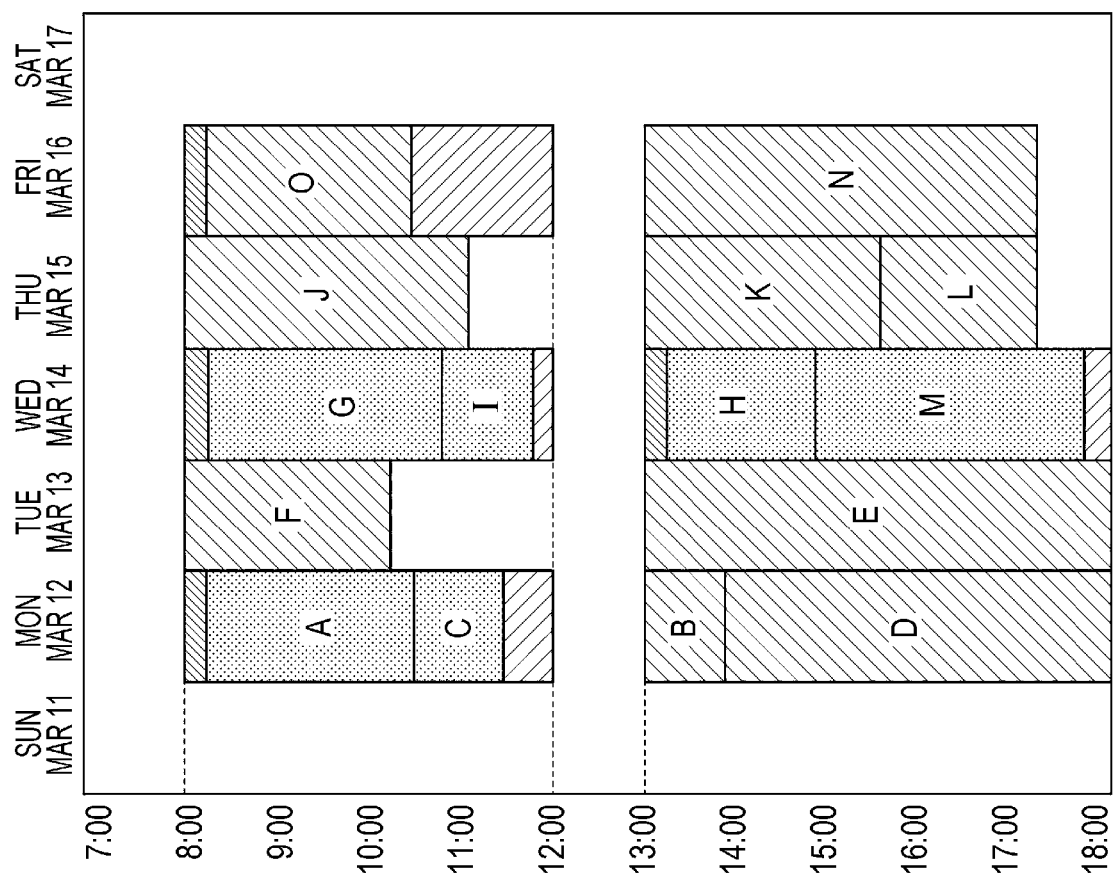

Then, the printing order determination unit 116 assigns the printing times of the print jobs in the low-image-quality group. As a result, as illustrated in FIG. 12E, all the print jobs in the low-image-quality group are assigned in the operating hours of the printer 200A. Thus, as illustrated in FIG. 12F, the results of the jobs A to O are "OK".

In the example described above, the printing order determination unit 116 adds a schedule of image quality adjustment at the time point when the printing time of the job H is assigned. However, this embodiment is not limited to this example. For example, the printing order determination unit 116 may suspend the assignment of the printing time of the job H and assign the printing times of the remaining print jobs in the high-image-quality group (i.e., the jobs I and M). Thereafter, the printing order determination unit 116 may add a schedule of image quality adjustment and assign the printing time of the job H. Alternatively, for example, the printing order determination unit 116 may suspend the assignment of the printing time of the job H and assign the printing times of all the other print jobs (i.e., the jobs A to O, except for the job H). Thereafter, the printing order determination unit 116 may add a schedule of image quality adjustment and assign the printing time of the job H.

Description of No Previous Scheduling of Image Quality Enhancement Process

Next, a case where image quality enhancement process is not scheduled in advance will be described. In this exemplary embodiment, even if an image quality enhancement process is not scheduled in advance by the operator, the process illustrated in FIGS. 11A and 11B may be performed to add a schedule of an image quality enhancement process and to assign the printing times of the print jobs in the high-image-quality group. In this case, the processing of S201 for setting a high-image-quality-guaranteed time period is not performed.

In the process illustrated in FIGS. 11A and 11B, the print jobs in the high-image-quality group are collectively processed earlier, and thus the print jobs in the high-image-quality group are likely to be printed earlier than the print jobs in the low-image-quality group. As a result, it is more likely that a print job in the low-image-quality group will not be completed by the deadline. To address this issue, an example will be described in which print jobs are collectively processed according to deadline, regardless of the image quality level. It is assumed here that the printing order of the jobs A to O illustrated in FIGS. 7A and 7B is determined. In addition, the description will be given taking a schedule of image quality adjustment as an exemplary schedule of an image quality enhancement process.

In the illustrated example, a period for classifying print jobs (hereinafter referred to as a "classification period") is set. The classification period may be set as, for example, the number of days such as 2 days or as days of the week such as Monday to Wednesday or Wednesday to Saturday. The classification period may be set by the operator or may be set by default (initial value).

The printing order determination unit 116 classifies print jobs into classification periods on the basis of the deadlines of the print jobs. For example, when each classification period is 2 days, in the example illustrated in FIG. 7A, the print jobs are classified as print jobs each having a deadline of March 12 or March 13, print jobs each having a deadline of March 14 or March 15, and print jobs each having a deadline of March 16 or March 19.

Specifically, the jobs A to E (i.e., the print jobs each having a deadline of March 12 or March 13) are grouped, the jobs F to K (i.e., the print jobs each having a deadline of March 14 or March 15) are grouped, and the jobs L to O (i.e., the print jobs each having a deadline of March 16 or March 19) are grouped.

Then, the printing order determination unit 116 performs the processing of S202 to S215 in FIGS. 11A and 11B on the classified print jobs. FIGS. 13A to 13F illustrate an exemplary process in a case where image quality adjustment is not scheduled in advance.

Figures 13A, 13B:
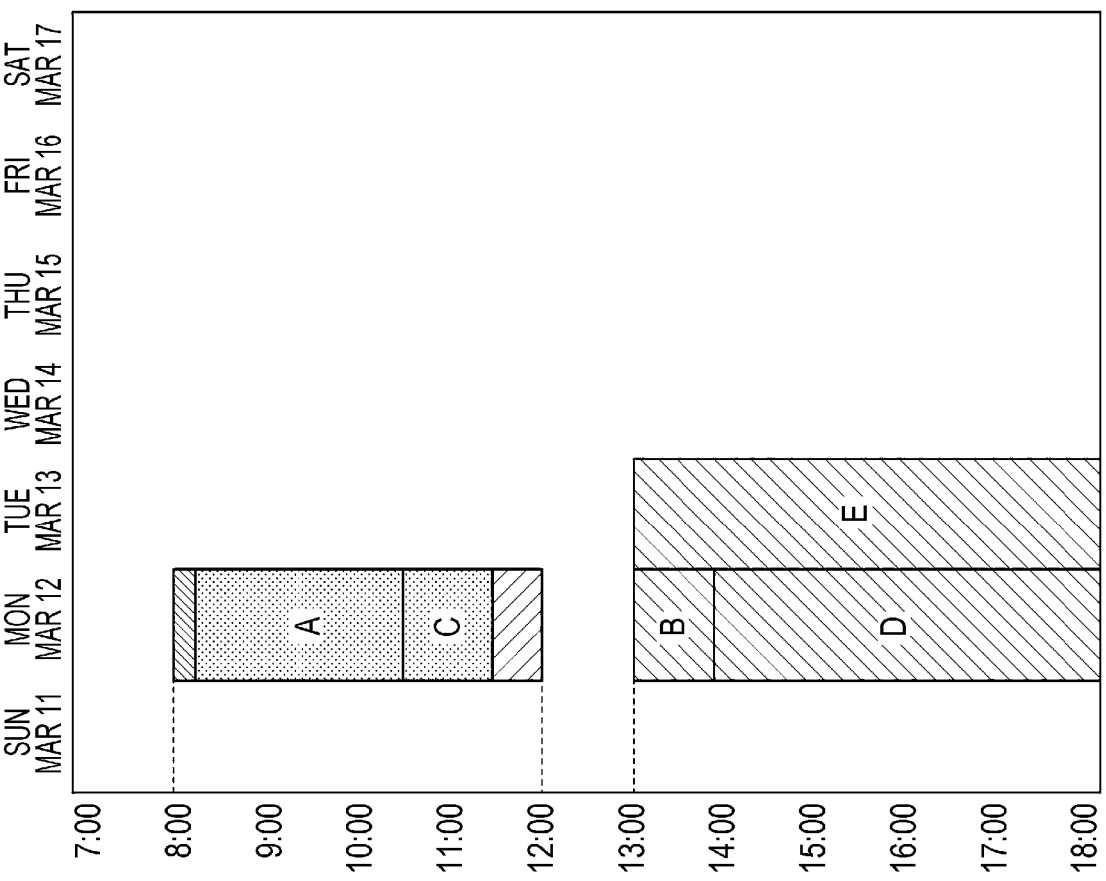

First, the printing order determination unit 116 performs the processing of S202 to S215 in FIGS. 11A and 11B on the jobs A to E (i.e., the print jobs each having a deadline of March 12 or March 13). Here, as illustrated in FIG. 13A, the printing order determination unit 116 adds a schedule of image quality adjustment for March 12 from 8:00 to 8:15. Further, the printing order determination unit 116 sets a time frame from 8:15 to 13:45 as a high-image-quality-guaranteed time period. Then, the printing order determination unit 116 assigns the printing times of the jobs A and C in the high-image-quality group and then assigns the printing times of the jobs B, D, and E in the low-image-quality group. Then, as illustrated in FIG. 13B, the results of the job A to the job E are "OK".

Then, the printing order determination unit 116 performs the processing of S202 to S215 in FIGS. 11A and 11B on the jobs F to K (i.e., the print jobs each having a deadline of March 14 or March 15). Here, as illustrated in FIG. 13C, the printing order determination unit 116 adds a schedule of image quality adjustment for March 13 from 8:00 to 8:15. Further, the printing order determination unit 116 sets a time frame from 8:15 to 13:45 as a high-image-quality-guaranteed time period. Then, the printing order determination unit 116 assigns the printing time of the job G in the high-image-quality group.

Then, the job H in the high-image-quality group is to be assigned. However, the printing time of the job H does not fit within the vacant time slot in the high-image-quality-guaranteed time period on March 13. Thus, the printing order determination unit 116 adds a schedule of image quality adjustment for March 14 from 8:00 to 8:15. Further, the printing order determination unit 116 sets a time frame from 8:15 to 13:45 as a high-image-quality-guaranteed time period. Then, the printing order determination unit 116 assigns the printing time of the job H. The printing time of the subsequent job I fits within the vacant time slot in the high-image-quality-guaranteed time period on March 13 and is thus assigned to March 13. Then, the printing order determination unit 116 assigns the printing times of the jobs F, J, and K in the low-image-quality group. Then, as illustrated in FIG. 13D, the results of the jobs F to K are "OK".

Figures 13E, 13F:
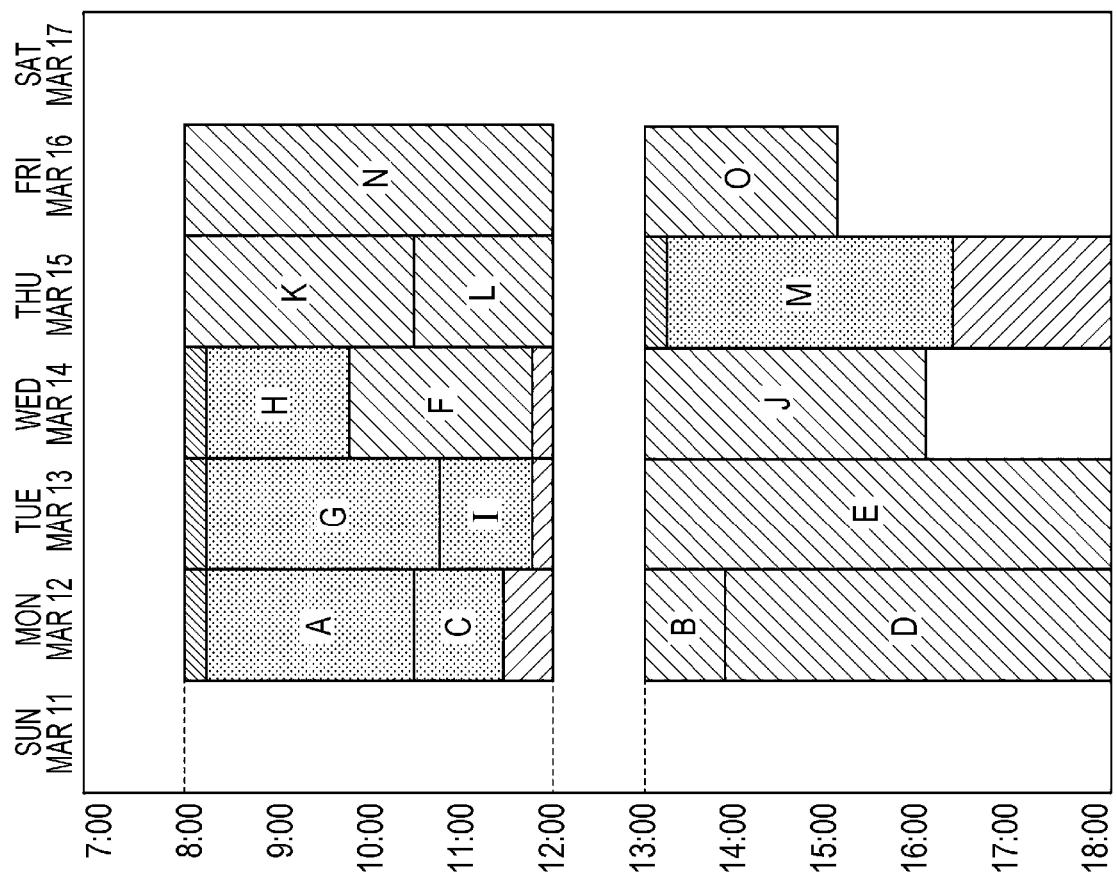

Then, the printing order determination unit 116 performs the processing of S202 to S215 in FIGS. 11A and 11B on the jobs L to O (i.e., the print jobs each having a deadline of March 16 or March 19). Here, as illustrated in FIG. 13E, the printing order determination unit 116 adds a schedule of image quality adjustment for March 15 from 13:00 to 13:15. Further, the printing order determination unit 116 sets a time frame from 13:15 to 18:00 as a high-image-quality-guaranteed time period. Then, the printing order determination unit 116 assigns the printing time of the job M in the high-image-quality group and then assigns the printing times of the jobs L, N, and O in the low-image-quality group. Then, as illustrated in FIG. 13F, the results of the jobs L to O are "OK".

In this exemplary embodiment, accordingly, even if an image quality enhancement process is not scheduled in advance, the printing order determination unit 116 adds a schedule of the image quality enhancement process and determines the printing order of print jobs.

In the example illustrated in FIGS. 13A to 13F, print jobs are collectively processed according to deadline. A similar process may be performed even when an image quality enhancement process is scheduled in advance. For example, in the example illustrated in FIG. 8A to 9B or the example illustrated in FIGS. 12A to 12F, the print jobs may be classified as print jobs each having a deadline of March 12 or March 13, print jobs each having a deadline of March 14 or March 15, and print jobs each having a deadline of March 16 or March 19 and may be sequentially processed.

As described above, the printing management apparatus 100 according to this exemplary embodiment determines the printing order of a plurality of print jobs in the printer 200, by using required image quality levels, each of which is acquired for one of the plurality of print jobs, and by using the printing characteristics of the printer 200. In this exemplary embodiment, accordingly, the printing order of print jobs is determined with consideration of image qualities required for printing results obtained by processing the print jobs.

In this exemplary embodiment, furthermore, the printing management apparatus 100 may provide a printing instruction or an image quality adjustment instruction to the printer 200. For example, the printing management apparatus 100 transmits print jobs to the printer 200. Further, the printing management apparatus 100 provides an instruction to the printer 200 to print the print jobs in accordance with the printing order determined by the printing order determination unit 116. For example, when job 1 is scheduled to be printed from 9:00 on Mar. 13, 2018, the printing management apparatus 100 provides an instruction to print the job 1 at 9:00 on Mar. 13, 2018. In accordance with the printing instruction, the printer 200 performs a printing process based on the job 1. Likewise, for example, the printing management apparatus 100 provides an image quality adjustment instruction to the printer 200 in accordance with the printing order determined by the printing order determination unit 116. In accordance with the image quality adjustment instruction, the printer 200 performs an image quality adjustment process.

In the examples described above, a high-image-quality-guaranteed time period is set. However, instead of a high-image-quality-guaranteed time period, for example, the number of sheets on which the printer 200 is guaranteed to yield high-quality printing results (hereinafter referred to as the "number of high-image-quality-guaranteed sheets") may be set. In this case, the printing order determination unit 116 acquires, for each print job, information on the number of output sheets on which the print job is printed (hereinafter referred to as the number of printed sheets). Then, the printing order determination unit 116 assigns the number of printed sheets of the print jobs in the high-image-quality group to the number of high-image-quality-guaranteed sheets and determines the printing order.

For example, a case where the number of high-image-quality-guaranteed sheets for the printer 200 is 1000 will be described as an example. Here, print jobs in the high-image-quality group include jobs A, B, and C in ascending order of deadline (earliest deadline first), and the jobs A, B, and C are assumed to be printed on 500 sheets, 400 sheets, and 200 sheets, respectively. In this case, the printing order determination unit 116 assigns, as print jobs to be printed after the completion of an image quality enhancement process, 500 sheets for the job A and 400 sheets for the job B to the high-image-quality-guaranteed sheets. If the sheets for the job C are also assigned, the total number of printed sheets is over 1000, or is 1100. Thus, the sheets for the job C are assigned to the high-image-quality-guaranteed sheets in the next printing. Further, the printing order determination unit 116 assigns the print jobs in the low-image-quality group to the operating hours of the printer 200, except for the time period during which the print jobs in the high-image-quality group are printed.

The number of high-image-quality-guaranteed sheets may be designated by, for example, the operator or may be set in the printing management apparatus 100 in advance. The number of high-image-quality-guaranteed sheets may be set in association with an image quality enhancement process such as image quality adjustment or replacement of parts. It should be noted that the number of high-image-quality-guaranteed sheets, which depends upon the printing performance of the printer 200, is included in the information concerning the printing performance of the printer 200.

In the example described above, furthermore, the printing order determination unit 116 determines the printing order of print jobs by using the deadlines for completion of printing the print jobs and the printing times of the print jobs. However, the printing order determination unit 116 may determine the printing order without using the deadlines or the printing times. For example, if there is a schedule of image quality adjustment, the printing order determination unit 116 may determine the printing order of print jobs such that print jobs in the high-image-quality group are printed after completion of image quality adjustment preferentially over print jobs in the low-image-quality group, and the deadlines for completion of printing the print jobs or the printing times of the print jobs may not necessarily be used.

In this exemplary embodiment, furthermore, the process of the printing management apparatus 100 may be performed not by the printing management apparatus 100 alone but by the printing management apparatus 100 and another device in a shared way. In this case, the printing management apparatus 100 and the other device are used as an example of a printing management system. The process of the printing management apparatus 100 may be performed by the printer 200. In this case, the printer 200 is used as an example of a printing management system and a printing management apparatus.

A program implementing an exemplary embodiment of the present disclosure may be provided by a communication means or may be stored in a recording medium such as a compact disc read-only memory (CD-ROM) and provided.

While a variety of exemplary embodiments and modifications have been described, these exemplary embodiments and modifications may be combined.

The present disclosure is not limited to the exemplary embodiment described above and may be implemented in various way without departing from the spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printing management system comprising:
a processor configured to
acquire one or more pieces of image quality information, each of the one or more pieces of image quality information being information on an image quality required for a printing result obtained by processing a piece of print information;
acquire a printing characteristic of a printer; and
determine a printing order of a plurality of pieces of print information in the printer, by using a plurality of pieces of image quality information, each of which is acquired for one of the plurality of pieces of print information, and by using the printing characteristic, wherein information concerning a change in printing performance of the printer over time is acquired as the printing characteristic, and the processor is further configured to determine the printing order on the basis of the acquired information.

2. The printing management system according to claim 1, wherein a schedule of image quality adjustment that is determined in the printer is acquired as the information concerning a change in printing performance of the printer over time, and
wherein the processor is further configured to determine the printing order on the basis of the acquired schedule of the image quality adjustment.

3. The printing management system according to claim 2, wherein the processor is further configured to determine the printing order such that, among the plurality of pieces of print information, a piece of print information for which the image quality required in the corresponding one of the plurality of pieces of image quality information exceeds a predetermined standard is printed before lapse of a predetermined period after completion of the image quality adjustment.

4. The printing management system according to claim 3, wherein the predetermined period comprises a period taken for a predetermined number of sheets to be printed.

5. The printing management system according to claim 3, wherein the processor is further configured to output a request for an additional schedule of the image quality adjustment when printing of a piece of print information among the plurality of pieces of print information, for which the image quality required in the corresponding one of the plurality of pieces of image quality information exceeds the predetermined standard, in the printing order is not completed before lapse of the predetermined period after completion of the image quality adjustment.

6. The printing management system according to claim 2, wherein the processor is further configured to determine the printing order such that, among the plurality of pieces of print information, a piece of print information for which the image quality required in the corresponding one of the plurality of pieces of image quality information exceeds a predetermined standard is printed after completion of the image quality adjustment preferentially over a piece of print information for which the image quality required in the corresponding one of the plurality of pieces of image quality information is less than or equal to the predetermined standard.

7. The printing management system according to claim 1, wherein the processor further configured to add a schedule of image quality adjustment to a vacant time slot during which the printer is scheduled to be in operation, in accordance with the image qualities required in the plurality of pieces of image quality information.

8. The printing management system according to claim 7, wherein
in a case where a printing order of a piece of print information among the plurality of pieces of print information, for which the image quality required in the corresponding one of the plurality of pieces of image quality information exceeds a predetermined standard, is determined,
the processor is further configured to add a schedule of image quality adjustment when there is no schedule of image quality adjustment or when printing of the piece of print information is not completed before lapse of a predetermined period after completion of the image quality adjustment.

9. The printing management system according to claim 1, wherein the processor is further configured to add, for a piece of print information among the plurality of pieces of print information, for which the image quality required in the corresponding one of the plurality of pieces of image quality information exceeds a predetermined standard, a schedule of a check process for checking an image quality of a printing result obtained by processing the piece of print information,
wherein the processor further configured to determine the printing order such that printing of the piece of print information includes the check process.

10. The printing management system according to claim 1,
wherein the printing characteristic comprises a schedule of image quality adjustment that is determined in the printer, and
the processor is further configured to control a display to display, as the printing order, a time slot for the schedule of image quality adjustment that is determined in the printer and time slots each assigned to a schedule of printing one of the plurality of pieces of print information.

11. The printing management system according to claim 10, wherein the processor is further configured to control the display to display information indicating a list of one or more pieces of print information among the plurality of pieces of print information, each of the one or more pieces of print information being information for which the image quality required in the corresponding one of the plurality of pieces of image quality information exceeds a predetermined standard and for which printing is not completed before lapse of a predetermined period after completion of the image quality adjustment.

12. The printing management system according to claim 1,
wherein the processor is further configured to assign each of a plurality of pieces of print information to one of a plurality of printers by using a plurality of pieces of image quality information, each of which is acquired for one of the plurality of pieces of print information, and by using a plurality of printing characteristics, each of which is acquired for one of the plurality of printers,
wherein the processor is further configured to determine, for each of the plurality of printers, a printing order of one or more pieces of print information assigned to the printer.

13. A printing management apparatus comprising:

a processor configured to acquire one or more pieces of image quality information, each of the one or more pieces of image quality information being information on an image quality required for a printing result obtained by processing a piece of print information;

acquire a printing characteristic of a printer; and output a printing order of a plurality of pieces of print information in the printer, the printing order being based on a plurality of pieces of image quality information, each of which is acquired for one of the plurality of pieces of print information, and based on the printing characteristic, wherein information concerning a change in printing performance of the printer over time is acquired as the printing characteristic, and the processor further configured to determine the printing order on the basis of the acquired information.

14. A non-transitory computer readable medium storing a program causing a computer to execute a process for printing management, the process comprising:

acquiring one or more pieces of image quality information, each of the one or more pieces of image quality information being information on an image quality required for a printing result obtained by processing a piece of print information;

acquiring a printing characteristic of a printer; and determining a printing order of a plurality of pieces of print information in the printer, by using a plurality of pieces of image quality information, each of which is acquired for one of the plurality of pieces of print information, and by using the acquired printing characteristic, wherein information concerning a change in printing performance of the printer over time is acquired as the printing characteristic, and the printing order is determined on the basis of the acquired information.

* * * * *